US012537834B2

(12) United States Patent
Zhao et al.

(10) Patent No.: US 12,537,834 B2
(45) Date of Patent: Jan. 27, 2026

(54) ATTACK DETECTION AND SOURCE TRACING METHOD AND APPARATUS, ELECTRONIC DEVICE, AND STORAGE MEDIUM

(71) Applicants: STATE GRID JIANGSU ELECTRIC POWER CO., LTD. INFORMATION & TELECOMMUNICATION BRANCH, Nanjing (CN); STATE GRID JIANGSU ELECTRIC POWER CO., LTD., Nanjing (CN); NANJING UNIVERSITY OF SCIENCE AND TECHNOLOGY, Nanjing (CN)

(72) Inventors: Xinjian Zhao, Nanjing (CN); Mingming Zhang, Nanjing (CN); Weiwei Miao, Nanjing (CN); Peng Gao, Nanjing (CN); Qianmu Li, Nanjing (CN); Yixin Ding, Nanjing (CN); Ling Zhuang, Nanjing (CN); Guoquan Yuan, Nanjing (CN); Jiaming Mao, Nanjing (CN); Song Zhang, Nanjing (CN); Shi Chen, Nanjing (CN); Linjiang Shang, Nanjing (CN); Chenwei Xu, Nanjing (CN); Shunmei Meng, Nanjing (CN); Xiaochao Li, Nanjing (CN)

(73) Assignees: STATE GRID JIANGSU ELECTRIC POWER CO., LTD. INFORMATION & TELECOMMUNICATION BRAUNCH, Nanjing (CN); STATE GRID JIANGSU ELECTIC POWER CO., LTD., Nanjing (CN); NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 0 days.

(21) Appl. No.: 19/242,263

(22) Filed: Jun. 18, 2025

(65) Prior Publication Data

US 2025/0373631 A1 Dec. 4, 2025

Related U.S. Application Data

(63) Continuation of application No. PCT/CN2025/086284, filed on Mar. 31, 2025.

(30) Foreign Application Priority Data

Jun. 3, 2024 (CN) .......................... 202410707745.5

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01); *H04L 63/1425* (2013.01)

(58) Field of Classification Search
None
See application file for complete search history.

(56) References Cited

U.S. PATENT DOCUMENTS 9,166,997 B1 * 10/2015 Guo .................. G06F 21/554
9,292,695 B1 3/2016 Bassett
(Continued)

FOREIGN PATENT DOCUMENTS

CA 3041871 A1 * 11/2019 ......... H04L 63/1425
CN 112822220 A 5/2021
(Continued)

OTHER PUBLICATIONS

International Search Report for International Application No. PCT/CN2025/086284, dated Jul. 2, 2025 (Jul. 2, 2025)—2 pages (English translation—2 pages).
(Continued)

*Primary Examiner* — Joseph P Hirl
*Assistant Examiner* — Hassan Saadoun
(74) *Attorney, Agent, or Firm* — CM LAW; Stephen J. Weed

(57) ABSTRACT

An attack detection and source tracing method includes acquiring entities in a target network environment and interaction event information between the entities and constructing a network event graph with the entities and the
(Continued)

interaction event information; determining a graph embedding vector of each interaction event information in the network event graph as feature information based on a preset attack feature recognition model and determining an attack event in the network event graph according to the feature information; determining dependencies between the attack event and remaining interaction event information in the network event graph and searching for a corresponding interaction event information as source tracing information of the attack event according to the dependencies.

20 Claims, 7 Drawing Sheets

(56) References Cited

U.S. PATENT DOCUMENTS

| | | | | |
|---|---|---|---|---|
| 10,521,584 | B1* | 12/2019 | Sharifi Mehr | ...... H04L 63/1433 |
| 2016/0205122 | A1 | 7/2016 | Bassett | |
| 2019/0132344 | A1* | 5/2019 | Lem | ...... G06N 5/022 |
| 2021/0176260 | A1 | 6/2021 | Pan et al. | |
| 2021/0360015 | A1* | 11/2021 | Mammadli | ...... H04L 63/1466 |
| 2021/0409446 | A1 | 12/2021 | Di Mattia | |
| 2023/0208882 | A1* | 6/2023 | Crabtree | ...... H04L 63/1408 726/22 |
| 2025/0175482 | A1* | 5/2025 | Herwono | ...... H04L 63/1416 |

FOREIGN PATENT DOCUMENTS

| | | | | | |
|---|---|---|---|---|---|
| CN | 114422224 | A | | 4/2022 | |
| CN | 115378733 | A | * | 11/2022 | ...... H04L 63/1425 |
| CN | 115776401 | A | | 3/2023 | |
| CN | 115883213 | A | | 3/2023 | |
| CN | 114422224 | B | * | 8/2023 | ...... H04L 63/1416 |
| CN | 116886379 | A | * | 10/2023 | ...... H04L 63/1416 |
| CN | 117473492 | A | * | 1/2024 | ...... G06F 21/554 |
| CN | 114442224 | B | * | 2/2024 | ...... G02B 6/122 |
| CN | 118555110 | A | | 8/2024 | |
| EP | 4432094 | A1 | * | 9/2024 | ...... G06F 21/52 |
| WO | WO-2020100284 | A1 | * | 5/2020 | ...... G06F 21/52 |

OTHER PUBLICATIONS

1st Chinese Office Action for CN 202410707745.5 dated Jan. 23, 2025 (Jan. 23, 2025), 4 pages (English translation—6 pages).

* cited by examiner

ATTACK DETECTION AND SOURCE TRACING METHOD AND APPARATUS, ELECTRONIC DEVICE, AND STORAGE MEDIUM

This is a continuation application of International Patent Application No. PCT/CN2025/086284, filed Mar. 31, 2025, which claims priority to Chinese Patent Application No. 202410707745.5 filed with the China National Intellectual Property Administration (CNIPA) on Jun. 3, 2024, the disclosures of which are incorporated herein by reference in their entireties.

TECHNICAL FIELD

The present application relates to the field of network security technology, for example, to an attack detection and source tracing method, an attack detection and tracing apparatus, an electronic device, and a storage medium.

BACKGROUND

In recent years, with the continuous evolution of multi-step complex attacks, attack manners have become increasingly complex and diverse, often using a variety of advanced technologies such as unknown vulnerabilities, supply chain penetration, and social engineering, with extremely high concealment, targeting, and persistence. This type of attacks poses a serious threat to computer networks, and conventional detection manners are difficult to accurately capture and timely block related threats.

In the related art, a graph neural network method may be used for detecting an attack event. In this method, attack detection is achieved by performing deep feature learning on the graph structure of a network event in combination with an anomaly detection algorithm. However, the opaque nature of a graph neural network model is inconsistent with the source tracing interpretability of attack detection in a production environment. A graph neural network is formed by training a large amount of data and includes millions of neurons. The high complexity of the internal structure makes it difficult for people to understand a decision of the neural network, making it difficult to trust a detection result and impossible to trace the source of the attack event. Therefore, how to trace the source of an attack event in a network has become an urgent problem to be solved.

SUMMARY

The present application provides an attack detection and source tracing method, an attack detection and source tracing apparatus, an electronic device, and a storage medium to solve the problems in the related art that a monitoring result of an attack event is inaccurate and the attack event cannot be correctly traced.

According to an aspect of the present application, an attack detection and source tracing method is provided. The method includes the steps below.

Entities in a target network environment and multiple pieces of interaction event information between the entities are acquired, and a network event graph is constructed with the entities and the multiple pieces of interaction event information.

A graph embedding vector of each piece of interaction event information in the network event graph is determined as feature information based on a preset attack feature recognition model, and an attack event in the network event graph is determined according to the feature information.

Dependencies between the attack event and remaining interaction event information in the network event graph are determined, and corresponding interaction event information is searched as source tracing information of the attack event according to the dependencies.

According to another aspect of the present application, an attack detection and source tracing apparatus is provided. The apparatus includes the modules below.

An event graph construction module is configured to acquire entities in a target network environment and multiple pieces of interaction event information between the entities and construct a network event graph with the entities and the multiple pieces of interaction event information.

An attack event determination module is configured to determine a graph embedding vector of each piece of interaction event information in the network event graph as feature information based on a preset attack feature recognition model and determine an attack event in the network event graph according to the feature information.

An information source tracing module is configured to determine dependencies between the attack event and remaining interaction event information in the network event graph and search for corresponding interaction event information as source tracing information of the attack event according to the dependencies.

According to another aspect of the present application, an electronic device is provided. The electronic device includes at least one processor and a memory communicatively connected to the at least one processor.

The memory stores a computer program executable by the at least one processor to cause the at least one processor to perform the attack detection and source tracing method of any embodiment of the present application.

According to another aspect of the present application, a computer-readable storage medium is provided. The computer-readable storage medium stores computer instructions that, when executed by a processor, are configured to cause the processor to perform the attack detection and source tracing method of any embodiment of the present application.

DETAILED DESCRIPTION

For a better understanding of solutions of the present application by those skilled in the art, technical solutions in embodiments of the present application are described clearly and completely hereinafter in conjunction with the drawings in the embodiments of the present application. Apparently, the embodiments described hereinafter are part, not all, of embodiments of the present application. Based on the embodiments of the present application, all other embodiments obtained by those of ordinary skill in the art without creative work are within the scope of the present application.

It is to be noted that terms such as "first" and "second" in the description, claims, and drawings of the present application are used to distinguish between similar objects and are not necessarily used to describe a particular order or sequence. It is to be understood that data used in this manner are interchangeable where appropriate so that the embodiments of the present application described herein can be implemented in an order not illustrated or described herein. Additionally, terms "include", "have", and any variations thereof are intended to encompass a non-exclusive inclusion. For example, a process, method, system, product, or device that includes a series of steps or units not only includes the expressly listed steps or units but may also include other steps or units that are not expressly listed or are inherent to such process, method, product, or device.

Figure 1:
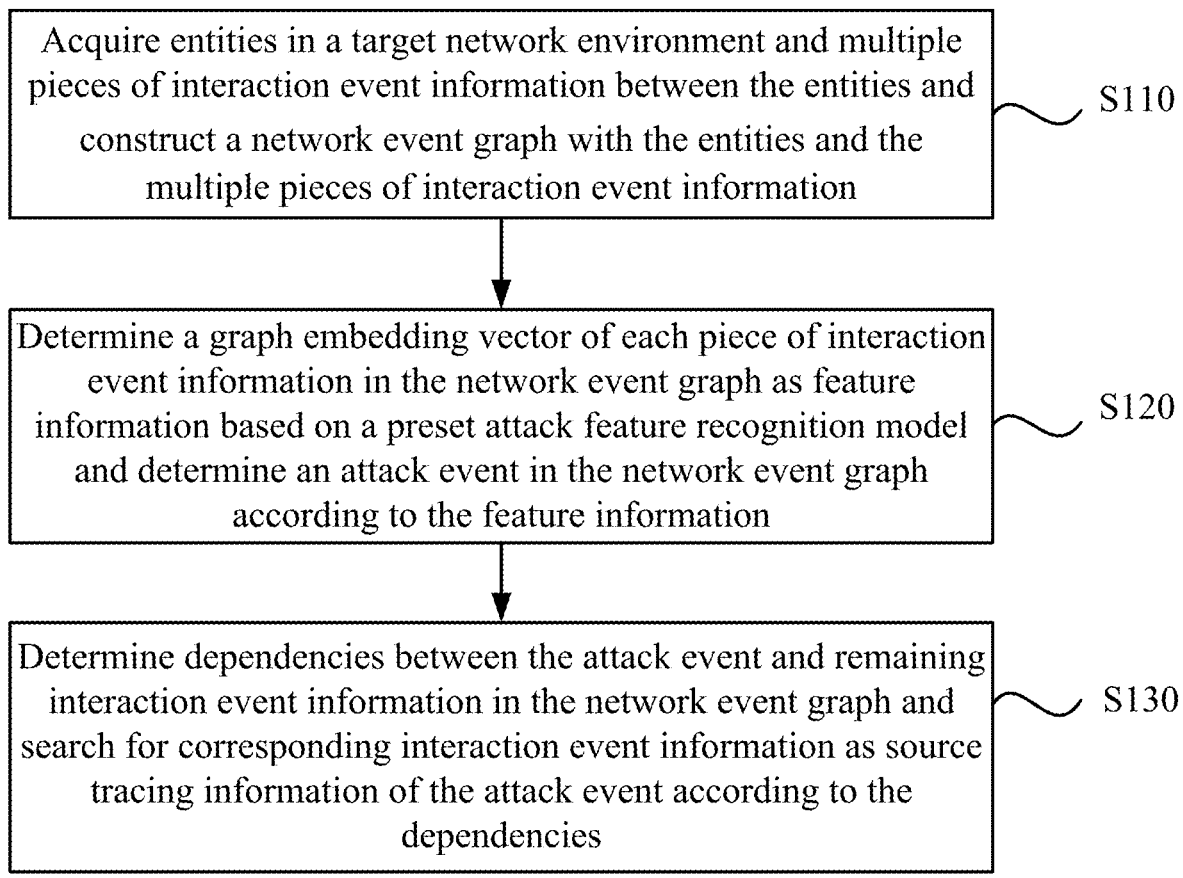
FIG. 1 is a flowchart of an attack detection and source tracing method according to some embodiments of the present application.

FIG. 1 is a flowchart of an attack detection and source tracing method according to some embodiments of the present application. This embodiment may be applied to the case of detecting and source tracing an attack event in a network environment. The method may be executed by an attack detection and source tracing apparatus. The attack detection and source tracing apparatus may be implemented in the form of hardware and/or software and may be configured in an electronic device. As shown in FIG. 1, the method includes the steps below.

In S110, entities in a target network environment and multiple pieces of interaction event information between the entities are acquired, and a network event graph is constructed with the entities and the multiple pieces of interaction event information.

The target network environment may be understood as a network environment that requires network security monitoring. Exemplarily, the target network environment may include, but is not limited to, an intranet environment, an extranet environment, or a local area network environment. The entities may include all devices and users that participate in a network activity, such as computer devices, servers, network devices, and data centers. The interaction event information between the entities may be understood as data interaction behavior information between any two entities. Exemplarily, the interaction event information may include the occurrence direction of an event and the type of the event, such as data transmission, access request and response, service call, fault and repair, and traffic control. The network event graph is a graphical representation used to intuitively display and analyze events occurring between the entities in the target network environment and the relationships between the entities.

In a possible embodiment, log information in the target network environment may be extracted, and entities and multiple pieces of interaction event information between the entities may be extracted from the log information; or network traffic, connection state, and other information in the target network environment may be monitored in real time to capture the entities in the target network environment and a piece of interaction event information between the entities. The network event graph is then generated with the entities as nodes and the piece of interaction event information as an edge connecting two corresponding entities.

In S120, a graph embedding vector of each piece of interaction event information in the network event graph is determined as feature information based on a preset attack feature recognition model, and an attack event in the network event graph is determined according to the feature information.

The preset attack feature recognition model may be understood as a pre-trained model for the attack event in a device network event graph. In a possible embodiment, the preset attack feature recognition model may be generated based on an encoder-decoder architecture. In the actual operation process, the network event graph may be input into the preset attack feature recognition model to automatically determine the attack event in the network event graph. The attack event may be understood as a specific behavior or activity that is initiated by a malicious actor in the target network environment and is intended to cause damage, destruction, theft, or interference to a network system, a device, data, or a user. Exemplarily, the attack event may include, but is not limited to, tampering with data, a distributed denial-of-service (DDoS) attack, or a virus attack. The feature information may refer to an attribute and a function that indicate that the network event graph is different from other network event graphs. Exemplarily, the feature information may include a graph embedding vector of a piece of interaction event information, an embedding vector of an entity, or the like.

In a possible embodiment, the network event graph may be input into the preset attack feature recognition model, and graph embedding may be performed on the network event graph through the preset attack feature recognition model to obtain the graph embedding vector of each piece of interaction event information as the feature information. The probability of the feature information belonging to abnormal information is determined, and when the probability exceeds a preset threshold, a piece of interaction event information is considered as the attack event. In the actual operation process, the entities in the network event graph may form a node matrix, and multiple pieces of interaction event information may form a graph adjacency matrix; the node matrix and the graph adjacency matrix can be processed by an encoder to generate a node embedding vector of each node according to the embedding of the node matrix and the graph adjacency matrix; node embedding vectors associated with the interaction event information are aggregated to obtain a graph embedding vector of the interaction event information; the graph embedding vector is used as feature information. Alternatively, each row in the graph adjacency matrix may be directly considered as one graph embedding vector, and the graph embedding vector is used as the feature information. In a possible embodiment, in the case where it is determined that the network environment includes the attack event, an attack alarm may be generated to prompt a user to handle the attack event in time.

In S130, dependencies between the attack event and remaining interaction event information in the network event graph are determined, and corresponding interaction event information is searched as source tracing information of the attack event according to the dependencies.

The dependencies may be understood as associations between the attack event and the remaining interaction event information in the network event graph, and the dependencies may be association probabilities. The source tracing information refers to information for finding the source of an attack, and the source tracing information may include one or more pieces of interaction event information.

In a possible embodiment, the dependencies between the attack event and the remaining interaction event information in the network event graph may be determined by polling. Exemplarily, the dependencies between the remaining multiple pieces of interaction event information and the attack event may be determined sequentially, and the multiple pieces of interaction event information may be combined to determine the dependency with the attack event after the combination; at least one piece of interaction event information corresponding to the maximum value among the dependencies may be used as the source tracing information of the attack event. In a possible embodiment, the dependencies between the attack event and the remaining multiple pieces of interaction event information may be determined by a pre-configured preset source tracing model; or the dependencies between the attack event and the remaining multiple pieces of interaction event information may be determined by manual confirmation. In a possible embodiment, the interaction event information may generate a Markov blanket to facilitate the display of the source tracing information.

In the embodiment of the present application, the entities in the target network environment and the multiple pieces of interaction event information between the entities are acquired, and the network event graph is constructed with the entities and the multiple pieces of interaction event information; the graph embedding vector of each piece of interaction event information in the network event graph is determined as the feature information based on the preset attack feature recognition model, and the attack event in the network event graph is determined according to the feature information, thereby automatically determining the attack event and improving the recognition capability of the attack event; the dependencies between the attack event and the remaining interaction event information in the network event graph are determined, and the corresponding interaction event information is searched as the source tracing information of the attack event according to the dependencies, thereby facilitating the finding of an interaction event information associated with the attack event, source tracing the attack event, and improving the accuracy of the source tracing information. In this manner, a potential attack behavior in the target network environment can be detected timely and conveniently, and defense and response can be carried out in advance, thereby ensuring the security of the target network environment.

Figure 2:
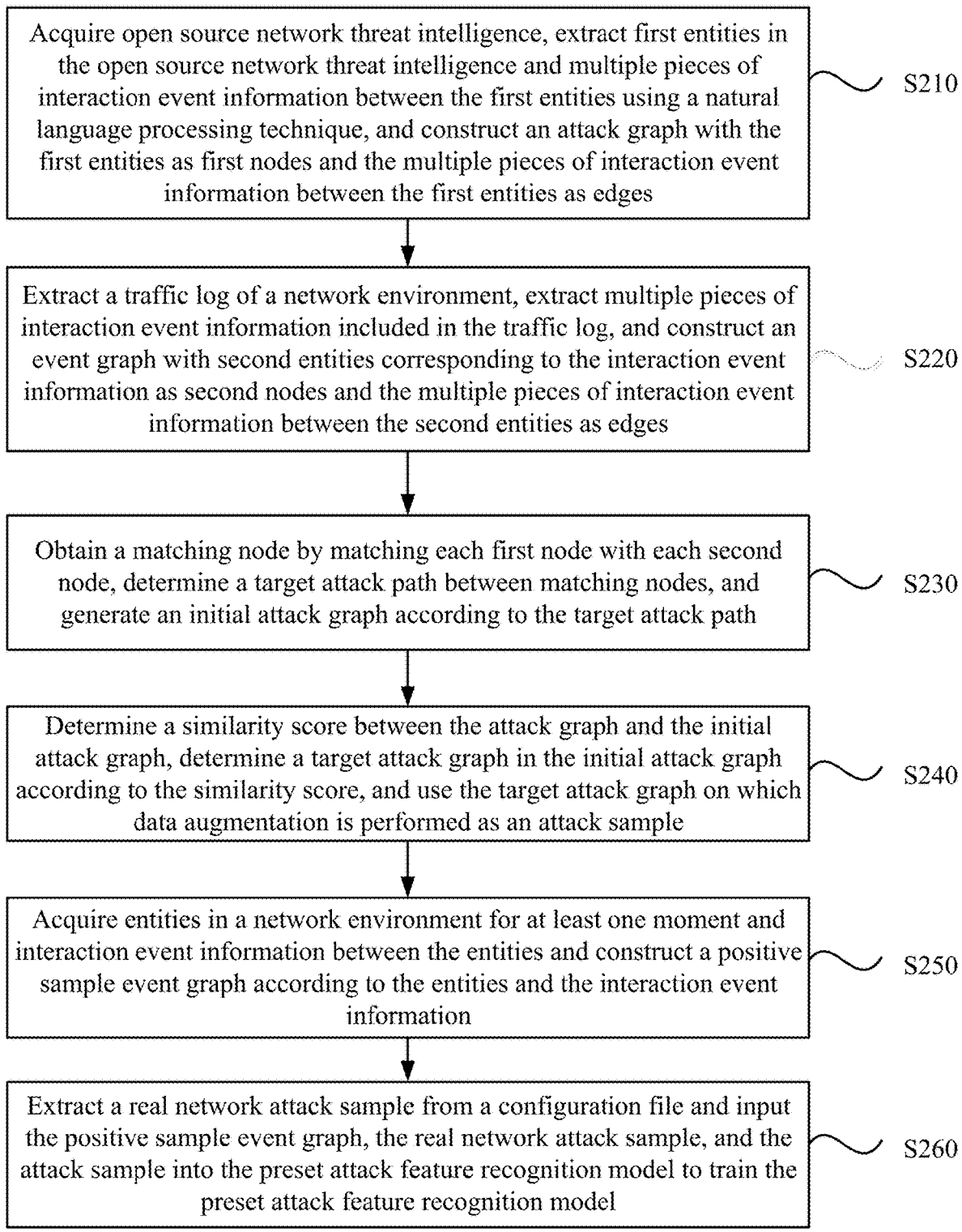
FIG. 2 is a flowchart of a method for training a preset attack feature recognition model according to some embodiments of the present application.

FIG. 2 is a flowchart of a method for training a preset attack feature recognition model according to some embodiments of the present application. This embodiment provides the method for training the preset attack feature recognition model based on the technical solution of the preceding embodiment. As shown in FIG. 2, the training of the preset attack feature recognition model includes the steps below.

In S210, open source network threat intelligence is acquired, first entities in the open source network threat intelligence and multiple pieces of interaction event information between the first entities are extracted using a natural language processing technique, and an attack graph is constructed with the first entities as first nodes and the multiple pieces of interaction event information between the first entities as edges.

The open source network threat intelligence refers to information that is associated with a network threat and is collected, analyzed, and sorted from a publicly available resource. Exemplarily, the open source network threat intelligence may be acquired from a social media platform, a research institute report, and a news website. The first entities may be understood as network entities included in the open source network threat intelligence, such as a device, a server, and a user. A piece of interaction event information between the first entities refers to an information interaction event between the first entities.

In a possible embodiment, the open source network threat intelligence may be extracted from a public platform, the first entities and the multiple pieces of interaction event information between the first entities that are included in the open source network threat intelligence may be extracted, and the attack graph is constructed with each first entity as a first node and the multiple pieces of interaction event information between the first entities as the edges.

In S220, a traffic log of a network environment is extracted, multiple pieces of interaction event information included in the traffic log are extracted, and an event graph is constructed with second entities corresponding to the interaction event information as second nodes and the multiple pieces of interaction event information between the second entities as edges.

The traffic log may be understood as an event record generated by the operation of entities such as a network device, a system, and a service program in the network environment. The second entities may be understood as network entities included in the traffic log, such as a device, a server, and a user.

In a possible embodiment, a storage region in the network environment may be accessed to acquire the traffic log in the network environment, the multiple pieces of interaction event information included in the traffic log may be extracted to determine a second entity corresponding to each piece of interaction event information, and the event graph may be constructed with the second entities as the second nodes and the multiple pieces of interaction event information between the second entities as the edges.

In S230, a matching node is obtained by matching each first node with each second node, a target attack path between matching nodes is determined, and an initial attack graph is generated according to the target attack path.

The matching node may be understood as a second node that matches a first node in the event graph, or a first node that matches a second node in the attack graph. In the actual operation process, a second node with the same or similar attribute information as a first node may be used as the matching node. Exemplarily, a first node and a second node that have the same name may be used as matching nodes; or in the case where names are different, a first node and a second node that have the same type may be used as matching nodes; or a first node and a second node that have the same feature information may be used as matching nodes.

In a possible embodiment, each first node may be polled and matched with the second nodes in the event graph sequentially, matched nodes may be used as the matching nodes, the matching nodes in the event graph are connected as target attack paths, and the target attack paths are connected sequentially to generate the initial attack graph.

In a possible embodiment, obtaining the matching node by matching each first node with each second node, determining the target attack path between the matching nodes, and generating the initial attack graph according to the target attack path includes:

determining attribute information of each first node and matching an associated point among the second nodes in the event graph as the matching node according to the attribute information, where the attribute information at least includes the name of each first node, the type of each first node, and feature information of each first node;

using any matching node as a starting node, traversing the event graph to find remaining matching nodes, and determining attack paths between the matching nodes;

determining the number of nodes in each attack path and using an attack path in which the number of nodes is less than or equal to a preset number as the target attack path between the matching nodes; and connecting the matching nodes and the target attack path to generate the initial attack graph.

The attribute information of each first node may be understood as information indicating the attribute of each first node, and the attribute information may at least include the name of each first node, the type of each first node, and the feature information of each first node. An influence score may be understood as the possibility that an attacker can control the attack path, that is, the possibility that the attack path may be generated during the attack process.

In a possible embodiment, the attribute information of each first node, such as the name of each first node, the type of each first node, and the feature information of each first node, may be determined, each first node may be matched with the second nodes in the event graph according to the attribute information, and the matching associated nodes may be used as matching nodes. In the actual operation process, attribute information of each second node may be determined, the similarity between the attribute information of each first node and the attribute information of each second node may be determined, and in the case where the similarity is greater than or equal to a preset similarity threshold, each first node is determined to be associated with each second node; or the first node and the second node that have the same name may be used as the matching nodes; or in the case where the names are different, the first node and the second node that have the same type may be used as the matching nodes; or the first node and the second node that have the same feature information may be used as the matching nodes. The any matching node is used as the starting node, the event graph is traversed to find the remaining matching nodes, and an attack path between every two matching nodes is determined. In a possible embodiment, the attack path between every two matching nodes may be searched using a depth-first strategy, and at least one attack path may be included between every two matching nodes. The number of nodes in each attack path is then determined, and the attack path in which the number of nodes is less than or equal to the preset number is used as the target attack path between the matching nodes. Alternatively, an attack path with the least number of nodes among attack paths between every two matching nodes may be determined as the target attack path. The matching nodes and the target attack path are connected to generate the initial attack graph.

In S240, a similarity score between the attack graph and the initial attack graph is determined, a target attack graph in the initial attack graph is determined according to the similarity score, and the target attack graph on which data augmentation is performed is used as an attack sample.

The similarity score is used to indicate the similarity between the attack graph and the initial attack graph. The higher the similarity score, the higher the similarity between the attack graph and the initial attack graph.

In the actual operation process, the similarity score between the attack graph and the initial attack graph may be calculated, and an initial attack graph with a similarity score greater than or equal to a preset similarity score is used as the target attack graph. The target attack graph on which the data augmentation is performed is used as the attack sample to increase the number of attack samples. In a possible embodiment, the data augmentation may be performed on the target attack graph in manners of node disturbance, edge disturbance, attribute masking, and random subgraph sampling.

In a possible embodiment, determining the similarity score between the attack graph and the initial attack graph, determining the target attack graph in the initial attack graph according to the similarity score, and performing the data augmentation on the target attack graph as the attack sample includes:

determining connection paths of the matching nodes in the attack graph, determining the number of nodes in each connection path, determining the reciprocal of the number of nodes in a connection path corresponding to two matching nodes, and using the maximum value of the reciprocal as an influence score of the two matching nodes;

determining the total number of all the connection paths and adding influence scores to obtain the sum of the influence scores;

using the product of the sum of the influence scores and the total number as the similarity score; and in the case where the similarity score is greater than or equal to the preset similarity score, determining the initial attack graph as the target attack graph and performing the data augmentation on the target attack graph as the attack sample.

In a possible embodiment, each matching node may be connected in the attack graph to determine the connection paths between the matching nodes. For every two matching nodes, one or more connection paths may be provided. The number of nodes in each connection path may be determined, the reciprocal of the number of nodes in the connection path corresponding to the two matching nodes may be determined, and the maximum value of the reciprocal may be used as the influence score of the two matching nodes. The total number of connection paths is determined, an influence score corresponding to each edge is added to obtain the sum of the influence scores, the sum of the influence scores is multiplied by the total number, and the product is used as the similarity score. In the case where it is determined that the similarity score is greater than or equal to the preset similarity score, the initial attack graph is determined as the target attack graph. The target attack graph on which the data augmentation is performed may be used as the attack sample. The data augmentation includes at least one of the node disturbance, the edge disturbance, the attribute masking, or the random subgraph sampling. Exemplarily, some nodes and associated edges in a random target attack graph may be discarded, or additional associated nodes and associated edges may be randomly selected from the random target attack graph and added to the target attack graph; or some edge elements in the target attack graph may be randomly discarded, or associated edges corresponding to events may be randomly selected and added to the target attack graph; or some or all of attribute information of some nodes in the target attack graph may be randomly masked; or associated nodes and associated edges in the target attack graph may be combined to implement the random subgraph sampling through random walks, thereby enabling the data augmentation to automatically generate the attack sample that is closer to an actual network attack behavior.

In S250, entities in a network environment for at least one moment and interaction event information between the entities are acquired, and a positive sample event graph is constructed according to the entities and the interaction event information.

In a possible embodiment, a traffic log of the network environment for the at least one moment may be acquired, entities in the traffic log and multiple pieces of interaction event information between the entities may be extracted, and the positive sample event graph may be constructed with the entities as nodes and the multiple pieces of interaction event information as edges.

In S260, a real network attack sample is extracted from a configuration file, and the positive sample event graph, the real network attack sample, and the attack sample are input into the preset attack feature recognition model to train the preset attack feature recognition model.

The real network attack sample may be understood as an attack sample really existing in the network environment and may be pre-stored.

In a possible embodiment, the positive sample event graph, the real network attack sample, and the attack sample may be input into the preset attack feature recognition model to train the preset attack feature recognition model.

In a possible embodiment, inputting the positive sample event graph, the real network attack sample, and the attack sample into the preset attack feature recognition model to train the preset attack feature recognition model includes S261 to S267.

In S261, the positive sample event graph and the attack sample are used as pre-trained samples, the pre-trained samples are input into the preset attack feature recognition model, local features of the pre-trained samples are extracted by using the preset attack feature recognition model respectively, and the local features are aggregated as a global feature.

The preset attack feature recognition model is formed based on the encoder-decoder architecture.

In a possible embodiment, the positive sample event graph and the attack sample may be used as the pre-trained samples to pre-train the preset attack feature recognition model. The local features of the pre-trained samples may include edge embedding vectors in the pre-trained samples, and the local features may be aggregated as the global feature. In a possible embodiment, the positive sample event graph may be represented as (X, A), where X denotes a node feature matrix of the positive sample event graph, and A denotes an adjacency matrix of the positive sample event graph. The attack sample is represented as ($\tilde{X}$, $\tilde{A}$), where $\tilde{X}$ denotes a node feature matrix of the attack sample, and $\tilde{A}$ denotes an adjacency matrix of the attack sample. The encoder uses information passing, aggregation, storage update, and embedding generation to acquire a local feature of the positive sample event graph, that is, H=ε(X, A)=($h_1$, $h_2$, ..., $h_n$), where ε denotes the encoder, and $h_1$–$h_n$ denotes the embedding representation of the nodes in the positive sample event graph. A local feature of the attack sample is represented as that $\tilde{H}$=ε($\tilde{X}$, $\tilde{A}$)=($\tilde{h}_1$, $\tilde{h}_2$, ..., $\tilde{h}_n$), where ε denotes the encoder, and $\tilde{h}_1$–$\tilde{h}_n$ denotes the embedding representation of the nodes in the attack sample. All the obtained local features are aggregated as the global feature by using a readout function. The readout function averages local features of all the nodes in the positive sample event graph as that $$R(H) = \frac{1}{n}\sum_{i=1}^{n} h_i,$$

where R(H) is used as the global feature of the positive sample event graph and is denoted by s. The local features of all the nodes in the attack sample are averaged as that $$R(\tilde{H}) = \frac{1}{n}\sum_{i=1}^{n} \tilde{h}_i,$$

where R($\tilde{H}$) is used as the global feature of the attack sample and is denoted by $\tilde{s}$.

In S262, a loss value of the preset attack feature recognition model is determined based on a preset pre-trained network loss function.

The pre-trained network loss function at least includes binary cross-entropy.

In a possible embodiment, the loss value of the preset attack feature recognition model may be determined by the preset pre-trained network loss function. Exemplarily, the pre-trained network loss function may include that $$\text{Loss} = \frac{1}{N+M}\Big(\sum_{i=1}^{N} E_{(X,A)}[\log F(h_i, s)] + \sum_{j=1}^{M} E_{(\tilde{X},\tilde{A})}[(1-\log F(\tilde{h}_i, \tilde{s}))]\Big),$$

where F denotes a discriminator function and is used to score the local features and the global feature. Exemplarily, in the case where a pre-trained sample is the positive sample event graph, the value of F($h_i$, s) is large, and in the case where the pre-trained sample is the attack sample, the value of F($h_1$, s) is small. Conversely, in the case where the pre-trained sample is the positive sample event graph, the value of F($\tilde{h}_1$, $\tilde{s}$) is small, and in the case where the pre-trained sample is the attack sample, the value of F($\tilde{h}_1$, $\tilde{s}$) is large. N and M denote the number of nodes in the positive sample event graph and the number of nodes in the attack sample respectively. $E_{(X,A)}$ denotes the mathematical expectation of the positive sample event graph; $E_{(\tilde{X},\tilde{A})}$ denotes the mathematical expectation of the attack sample.

In S263, the preset attack feature recognition model is iterated by using the loss value until the number of times of iterations is reached, and a parameter of the preset attack feature recognition model is adjusted during the iteration process to obtain a pre-trained preset attack feature recognition model.

In the actual operation process, the preset attack feature recognition model may be iterated according to the loss value until the number of times of iterations is reached, and parameters of the preset attack feature recognition model, such as the learning rate and the step size, may be adjusted during the iteration process to obtain pre-train the preset attack feature recognition model.

In S264, a real network attack sample graph is generated with entities in the real network attack sample as nodes and multiple pieces of event information between the entities as edges, an attack event in the real network attack sample graph is marked with an attack label, and the real network attack sample graph and the attack label are input into the pre-trained preset attack feature recognition model.

In a possible embodiment, the entities in the real network attack sample and the multiple pieces of event information between the entities may be determined, the real network attack sample graph may be generated with the entities in the real network attack sample as the nodes and the multiple pieces of event information between the entities as the edges, the attack event in the real network attack sample graph is marked with the attack label to indicate the attack event in the real network attack sample, and the real network attack sample graph and the attack label are input into the pre-trained preset attack feature recognition model for training.

In S265, the probability that each edge belongs to the attack event is determined through a fully-connected layer of an initial model, and in the case where it is determined that the probability is greater than or equal to a preset threshold, a piece of event information corresponding to each edge is determined as the attack event.

In a possible embodiment, the embedding mapping of each edge in the real network attack sample graph may be determined, the embedding of each edge is mapped to the probability of each edge belonging to the attack event through the fully connected layer, and in the case where it is determined that the probability is greater than or equal to the preset threshold, the event information corresponding to each edge is determined as the attack event.

In S266, in the case where it is determined that the attack event includes the attack label, a determination marker of the attack event is determined as 1, and in the case where it is determined that the attack event does not include the attack label, the determination marker of the attack event is determined as 0.

In S267, in the case where the determination marker is determined as 1, the product of a natural logarithm of each probability and a corresponding determination marker is determined as a first parameter, in the case where the determination marker is determined as 0, a natural logarithm of the probability of not belonging to the attack event is determined as a second parameter, the sum of the first parameter and the second parameter that correspond to the real network attack sample graph is used as a loss function value of the pre-trained preset attack feature recognition model, and the parameter of the preset attack feature recognition model is optimized according to the loss function value.

In a possible embodiment, in the case where the determination marker is determined as 1, a model determination may be considered to be an actual situation, and the product of the natural logarithm of each probability and the corresponding determination marker is determined as the first parameter, in the case where the determination marker is determined as 0, the model determination may be considered not to be an actual situation, and the natural logarithm of the probability of not belonging to the attack event is determined as the second parameter, the sum of the first parameter and the second parameter that correspond to the real network attack sample graph is used as the loss function value of the pre-trained preset attack feature recognition model, and the parameter of the preset attack feature recognition model is optimized according to the loss function value. That is, each edge in the real network attack sample graph is determined, and the sum of first parameters or second parameters that are determined by each edge is used as the loss function value of the pre-trained preset attack feature recognition model. In a possible embodiment, the loss function value is determined in a manner of $\mathrm{Loss}=\Sigma_x[y_x \log(p_x)+(1-y_x)\log(1-p_x)]$, where $y_x$ denotes whether edge x is the determination marker of the attack event, and $p_x$ denotes the predicted probability that x belongs to the attack event.

In the embodiment of the present application, the preset attack feature recognition model is pre-trained through the positive sample event graph and the attack sample, and then the pre-trained preset attack feature recognition model is re-trained according to the real network attack sample, so as to improve the accuracy of the preset attack feature recognition model, thereby more accurately determining the attack event according to the preset attack feature recognition model and improving the accuracy of attack detection.

Figure 3:
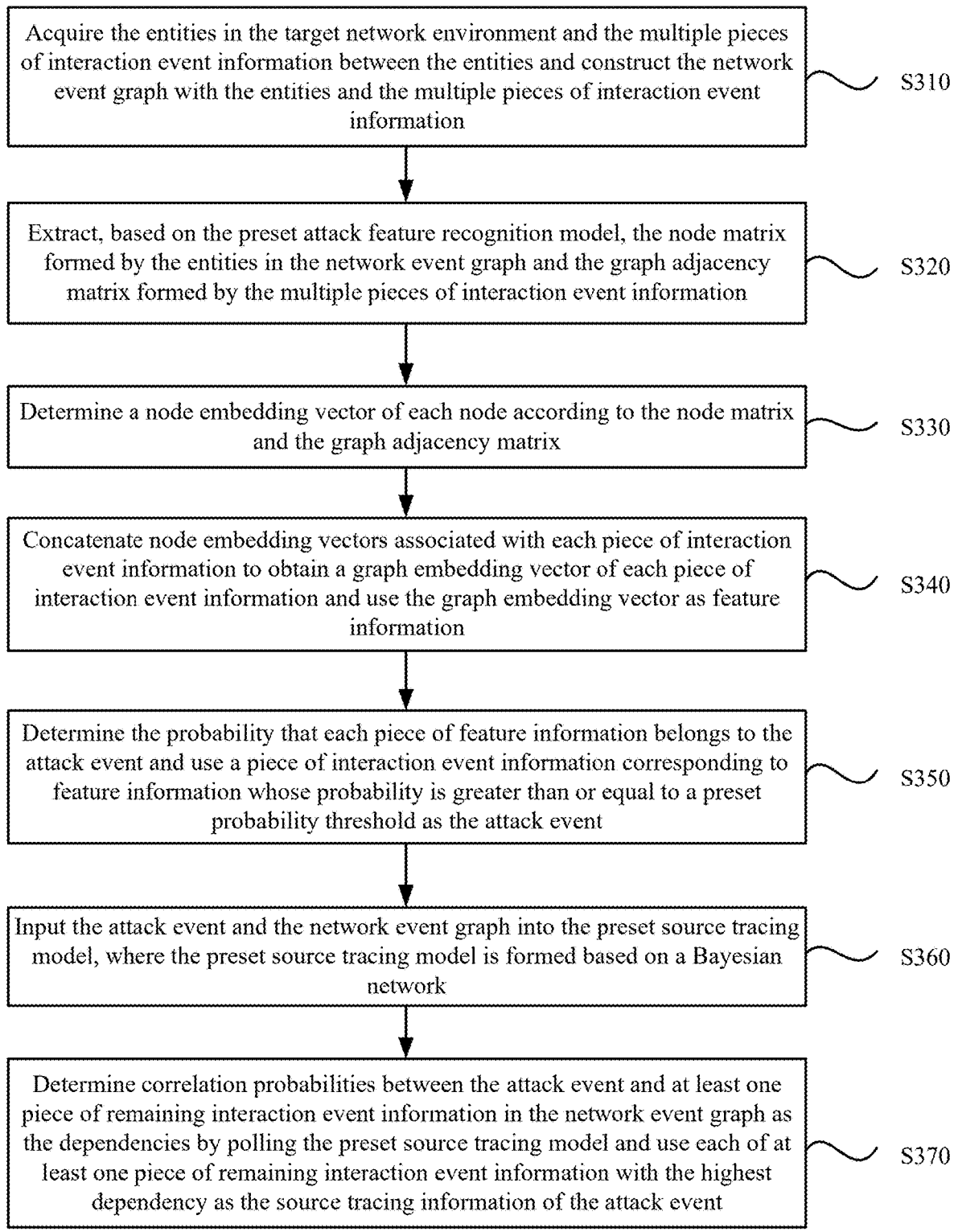
FIG. 3 is another flowchart of an attack detection and source tracing method according to some embodiments of the present application.

FIG. 3 is another flowchart of an attack detection and source tracing method according to some embodiments of the present application. This embodiment is further optimized and expanded based on the preceding embodiments and may be combined with various optional technical solutions in the preceding embodiments. As shown in FIG. 3, the method includes the steps below.

In S310, the entities in the target network environment and the multiple pieces of interaction event information between the entities are acquired, and the network event graph is constructed with the entities and the multiple pieces of interaction event information.

In S320, the node matrix formed by the entities in the network event graph and the graph adjacency matrix formed by the multiple pieces of interaction event information are extracted based on the preset attack feature recognition model.

The node matrix is a matrix used to represent the nodes in the graph; the graph adjacency matrix is a matrix used to represent the connection relationship between the nodes in the graph.

In a possible embodiment, the node matrix and the graph adjacency matrix may be constructed in advance according to the network event graph, and the node matrix formed by the entities in the network event graph and the graph adjacency matrix formed by the multiple pieces of interaction event information may be extracted through the preset attack feature recognition model.

In S330, a node embedding vector of each node is determined according to the node matrix and the graph adjacency matrix.

The node embedding vector may be understood as a vector that maps each node in the graph to a lower-dimensional vector space. The purpose of node embedding is to convert a node in the network event graph into a vector.

In a possible embodiment, after the node matrix and the graph adjacency matrix are determined, the node embedding vector of each node may be determined based on the preset attack feature recognition model. Exemplarily, the node embedding vector of each node may be determined by using a graph embedding algorithm.

In S340, node embedding vectors associated with each piece of interaction event information are concatenated to obtain a graph embedding vector of each piece of interaction event information, and the graph embedding vector is used as feature information.

In a possible embodiment, a node associated with each piece of interaction event information may be determined, a node embedding vector of the node may be determined, the node embedding vectors associated with each piece of interaction event information may be concatenated as the graph embedding vector of each piece of interaction event information, and the graph embedding vector may be used as the feature information.

In S350, the probability that each piece of feature information belongs to the attack event is determined, and a piece of interaction event information corresponding to feature information whose probability is greater than or equal to a preset probability threshold is used as the attack event.

In a possible embodiment, the probability that each piece of feature information is mapped to the attack event may be determined through the fully-connected layer of the preset attack feature recognition model. In the case where it is determined that the probability is greater than or equal to the preset probability threshold, interaction event information corresponding to the feature information is determined as the attack event.

In S360, the attack event and the network event graph are input into the preset source tracing model, where the preset source tracing model is formed based on a Bayesian network.

In S370, correlation probabilities between the attack event and at least one piece of remaining interaction event information in the network event graph are determined as the dependencies by polling the preset source tracing model, and at least one piece of remaining interaction event information with the highest dependency is used as the source tracing information of the attack event.

In a possible embodiment, the dependencies between the attack event and the remaining multiple pieces of interaction event information in the network event graph may be determined by polling the preset source tracing model. For example, the dependencies between remaining multiple pieces of interaction event information and the attack event may be sequentially determined, multiple pieces of interaction event information may be combined to determine the dependency with the attack event after the combination, and at least one piece of interaction event information corresponding to the maximum value among the dependencies may be used as the source tracing information of the attack event. In a possible embodiment, the quantitative dependency relationship between the attack event and other interaction event information may be expressed in the form of conditional probability to achieve source tracing of the attack.

In the embodiment of the present application, the entities in the target network environment and the multiple pieces of interaction event information between the entities are acquired, and the network event graph is constructed with the entities and the multiple pieces of interaction event information; the node matrix formed by the entities in the network event graph and the graph adjacency matrix formed by the multiple pieces of interaction event information are extracted based on the preset attack feature recognition model, the node embedding vector of each node is determined according to the node matrix and the graph adjacency matrix, the node embedding vectors associated with a piece of interaction event information are concatenated to obtain the graph embedding vector of the interaction event information, and the graph embedding vector is used as the feature information; the probability that each piece of feature information belongs to the attack event is determined, and interaction event information corresponding to the feature information whose probability is greater than or equal to the preset probability threshold is used as the attack event, thereby accurately determining the attack event; the attack event and the network event graph are input into the preset source tracing model, the correlation probabilities between the attack event and at least one piece of remaining interaction event information in the network event graph are determined as the dependencies by polling the preset source tracing model, and at least one remaining interaction event information with the highest dependency is used as the source tracing information of the attack event, thereby determining the source tracing information and improving the accuracy and convenience of determining the source tracing information.

In a possible embodiment, the training of the preset source tracing model includes:

extracting the attack event output by the preset attack feature recognition model and the network event graph input by the preset attack feature recognition model, and performing data augmentation using the attack event and the network event graph as samples to obtain training samples;

determining a Markov blanket of an attack event in the training samples according to a grow-shrink algorithm and using data in the Markov blanket as sample data;

determining the sample size of the sample data and a log-likelihood value of the sample data and a model parameter, determining the product of a natural logarithm of the sample size and a dimension of the model parameter, and using the difference between the product and the log-likelihood value as a Bayesian information criterion score of the sample data and the model parameter in the preset attack feature recognition model; and adjusting the model parameter based on the Bayesian information criterion score until the Bayesian information criterion score reaches a target score to complete the training of the preset source tracing model.

The Markov blanket is an algorithm used to determine the dependency relationship between the training samples. In the actual operation process, the Markov blanket may be determined by using the grow-shrink (GS) algorithm and other manners. The log-likelihood value may be used to measure the possibility of the sample data appearing under the model parameter and compare the degrees of fitting of different model parameter settings to the sample data. Adjusting the parameter to maximize the log-likelihood value can obtain the optimal fitting of the preset source tracing model. The Bayesian information criterion (BIC) score is a standard used to measure the goodness of fitting of the preset source tracing model. When the Bayesian information criterion score reaches the target score, the training of the preset source tracing model may be considered complete.

In a possible embodiment, the attack event output by the preset attack feature recognition model and the network event graph input by the preset attack feature recognition model may be extracted, that is, the input and output of the preset attack feature recognition model are obtained, and the data augmentation is performed with the input and output of the preset attack feature recognition model as the samples to obtain the training samples. In the actual operation process, the data augmentation manner may include, but is not limited to, the node disturbance, the edge disturbance, the attribute masking, and the random subgraph sampling. The Markov blanket of the attack event in the training samples is determined according to the grow-shrink algorithm, and the data in the Markov blanket is used as the sample data. That is, important variables may be selected, and unimportant variables may be filtered out. The sample size of the sample data and the log-likelihood value of the sample data and the model parameter are determined, and then the product of the natural logarithm of the sample size and the dimension of the model parameter is determined. The difference between the product and the log-likelihood value is used as the Bayesian information criterion score of the sample data and the model parameter in the preset attack feature recognition model. The model parameter may be adjusted according to the Bayesian information criterion score until the Bayesian information criterion score reaches the target score to complete the training of the preset source tracing model.

Figure 4:
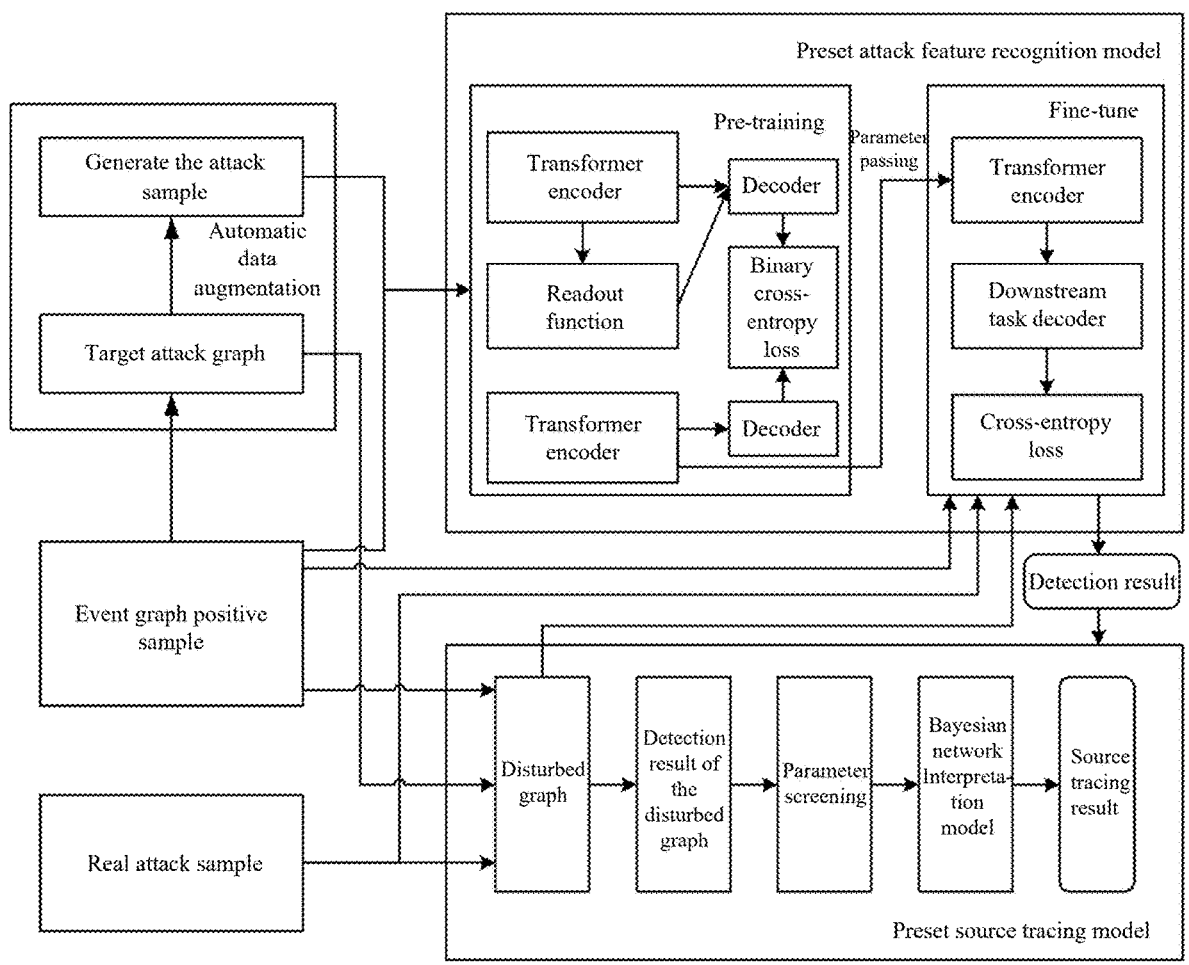
FIG. 4 is a block diagram illustrating the training structure of an attack detection and source tracing system according to some embodiments of the present application.

FIG. 4 is a block diagram illustrating the training structure of an attack detection and source tracing system according to some embodiments of the present application. The attack detection and source tracing system formed by the preset attack feature recognition model and the preset source tracing model is used as an example in this embodiment for further illustrating the training of the attack detection and source tracing system. As shown in FIG. 4, the attack detection and source tracing system includes the preset attack feature recognition model and the preset source tracing model. The preset attack feature recognition model is formed based on an encoder and a decoder. The preset source tracing model is formed based on a Bayesian network interpretation model. The training of the attack detection and source tracing system includes:

acquiring entities in the network environment and interaction behaviors between the entities at moments in continuous time to construct a dynamic heterogeneous event graph, where the dynamic heterogeneous event graph is used as the positive sample event graph.

Open source network threat intelligence related to a known network attack is widely collected, and entities involved in the known network attack and interaction relationships between the entities are extracted by using the natural language processing technique to form a corresponding attack graph, that is, the abstract representation of an attack path and context information of the known attack behavior, where the attack graph is denoted as $G_a$. Information such as a traffic log of the target network is modeled into an event graph in a "subject-action-object@time" event graph generation manner, and the event graph is denoted as $G_e$. Further, the attack graph $G_a$ is searched in the event graph $G_e$ based on a depth-first graph traversal algorithm to obtain an initial attack graph.

In a possible embodiment, for each node $v_k$ in the attack graph $G_a$, all the matching nodes $(v_{k,i})(i=1, \ldots, n_a)$ may be found in the event graph $G_e$ according to the name, type, and attribute information of each node and are recorded as matching nodes $(v_k, v_{k,i})$, where $n_a$ denotes the number of nodes in $G_a$. For each node $v_k$ in the attack graph $G_a$, each matching node $v_{k,i}$ of each node in the event graph $G_e$ is used as a search starting node, and the event graph $G_e$ is traversed until a matching node $v_{k,i}'$ of the next node $v_k'$ in the attack graph $G_a$ is found in the event graph $G_e$. In this case, search is performed based on the depth-first strategy, that is, the current matching node is used as the starting node, and the preceding steps are repeated until the next matching node is not found, and backtracking is performed.

For a path between node $v_i$ and $v_j$, the influence score $I_{v_i,v_j}$ represents the possibility that the attacker can control the entire attack path, and is defined as follows:

$$I_{v_i,v_j} = \underset{v_i \to v_j}{\text{MAX}}\left(\frac{1}{N_{min}(v_i \to v_j)}\right), N_{min}(e_i \to e_j) \leq N_{thr}.$$

$N_{min}(e_i \to e_j)$ denotes the minimum number of nodes that the attacker needs to control in order to control all the nodes on the path $e_i \to e_j$, and the value is equal to the minimum number of common ancestor nodes of all the nodes involved on the attack path $e_i \to e_j$; $N_{thr}$ denotes a preset threshold. When $N_{min}(e_i \to e_j) > N_{thr}$, $I_{v_i,v_j} = 0$, that is, it is considered that the attack path may not exist. When the influence score $I_{v_i,v_j}$ between the current node and the search starting node is 0, the search is stopped. This is used to improve search efficiency, and prune each path by influence scoring.

For the attack graph $G_a$, a set of initial attack graphs matched in the event graph $G_e$ is represented as $\{G_{a,e}\}$. The target attack graph is screened by calculating the similarity scores between the attack graph $G_a$ and the initial attack graphs $\{G_{a,e}\}$. The similarity scores are calculated as follows:

$$Sim(G_a, G_{a,e}) = \frac{1}{|M(G_{a,e})|} \sum_{(v_i \to v_j) M(G_{a,e})} I_{v_i,v_j}.$$

$v_i$ and $v_j$ denote nodes in $G_a$, $v_k$ and $v_l$ denote nodes in $G_{a,e}$, $v_i \to v_j$ denotes an attack path from node $v_i$ to node $v_j$ in $G_a$, $M(G_{a,e})$ denotes a set of corresponding paths of all the paths in $G_a$ in a similar subgraph $G_{a,e}$, and $|M(G_{a,e})|$ denotes the number of corresponding paths. Under the conditions of node $v_k$ matching node $v_i$ and node $v_l$ matching node $v_j$, the formula first calculates the sum of influence scores between all the node pairs (k, l) in the graph $G_{a,e}$ that satisfy at least one path from node $v_k$ to node $v_l$. Then, the sum is normalized by dividing the sum by the maximum possible value $|M(G_{a,e})|$, where $|M(G_{a,e})|$ denotes the number of paths in $G_{a,e}$. Since the maximum value of the influence score I between the two nodes is equal to 1, the number of paths automatically represents the maximum value of the sum of the influence scores. When $Sim(G_a, G_{a,e}) = 0$, $G_a$ does not have any similarity relationship with $G_{a,e}$ (that is, there is no matching node and no path between corresponding matching nodes); when $Sim(G_a, G_{a,e}) = 1$, $G_a$ is isomorphic to $G_{a,e}$. Therefore, when the similarity score $Sim(G_a, G_{a,e})$ exceeds the preset threshold $S_{thr}$, the initial attack graph is added to a set of target attack graphs.

Based on the searched target attack graph and the event graph, in conjunction with a graph data disturbance manner, variants of an attack subgraph with prior knowledge are embedded into a normal network entity behavior to obtain the attack sample, that is, the construction of strong negative examples. In a possible embodiment, the node disturbance manner may be used to randomly discard some nodes and associated edges in the target attack graph or randomly select additional associated nodes and associated edges in the event graph $G_a$ and add them to $G_{a,e}$; or the edge disturbance manner may also be used to randomly discard some edge elements in the target attack graph $G_{a,e}$ or randomly select associated edges in the event graph $G_a$ and add them to $G_{a,e}$; or the attribute masking manner may be used to randomly mask some or all attribute information of some nodes in the target attack graph $G_{a,e}$; or the random subgraph manner may also be used to implement random subgraph sampling through random walks in conjunction with associated nodes and associated edges in the event graph $G_a$ to obtain the attack sample, that is, a negative sample event graph.

Figure 5:
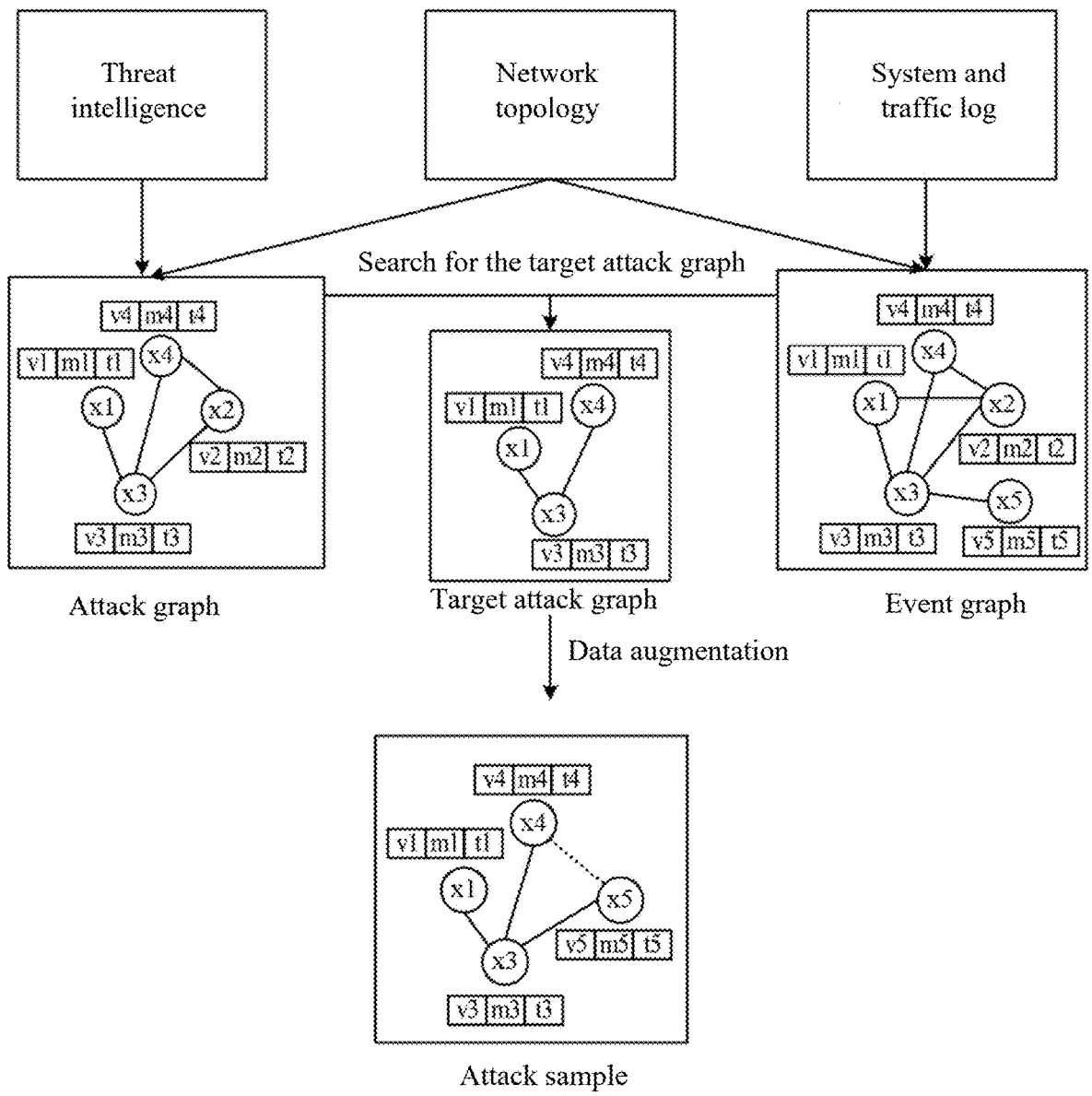
FIG. 5 is a schematic diagram of a method for determining an attack sample according to some embodiments of the present application.

In a possible embodiment, FIG. 5 is a schematic diagram of a method for determining an attack sample according to some embodiments of the present application. As shown in FIG. 5, after the attack graph is determined according to threat intelligence, and the event graph is determined according to the system and the traffic log, the matching nodes may be determined in the event graph through the nodes in the attack graph to obtain the initial attack graph, and the data augmentation is performed on the initial attack graph to obtain the attack sample.

Using file copy in a dataset as an example, the normal behavior sequence is "login to computer→insert USB drive→copy files→unplug USB drive→log out of computer", and the negative sample behavior sequence that may be generated includes "login to computer→insert USB drive→execute malicious code→copy files→establish CC channel→unplug USB drive→log out of computer".

The preset attack feature recognition model is a continuous-time dynamic heterogeneous graph network based on the encoder-decoder paradigm. The encoder of the preset attack feature recognition model is pre-trained by using a contrastive learning method and inputting the positive sample event graph and the negative sample event graph that are generated in the preceding.

The positive sample event graph may be represented as $(X, A)$, where X denotes a node feature matrix of the positive sample event graph, and A denotes an adjacency matrix of the positive sample event graph. The negative sample event graph generated based on $(X, A)$ is represented as $(\tilde{X}, \tilde{A})$, where $\tilde{X}$ denotes a node feature matrix of the negative sample event graph, and $\tilde{A}$ denotes an adjacency matrix of the negative sample event graph. The preset attack feature recognition model uses information passing, aggregation, storage update, and embedding generation to acquire a local feature, that is, $H=\varepsilon(X, A)=(h_1, h_2, \ldots, h_n)$, where $\varepsilon$ denotes the encoder, and $h_i$–$h_n$ denotes the embedding representation of the nodes in the positive sample event graph. A local feature of the negative sample event graph is represented as that $\tilde{H}=\varepsilon(\tilde{X}, \tilde{A})=(\tilde{h}_1, \tilde{h}_n, \ldots, \tilde{h}_n)$, where $\varepsilon$ denotes the encoder, and $\tilde{h}_1$–$\tilde{h}_n$ denotes the embedding representation of the nodes in the negative sample event graph. All the obtained local features are aggregated as the global feature by using a readout function. The readout function averages local features of all the nodes in the positive sample event graph as that $$R(H) = \frac{1}{n}\sum_{i=1}^{n} h_i,$$

and the global feature of the positive sample event graph is that $s=R(H)$. The local features of all the nodes in the negative sample event graph are averaged as that $$R(\tilde{H}) = \frac{1}{n}\sum_{i=1}^{n} \tilde{h}_i,$$

where $R(H)$ is used as the global feature of the attack sample and is denoted by $\tilde{s}$. The pre-training of the preset attack feature recognition model is completed by using a standard binary cross-entropy loss function.

The loss function may be that $$\text{Loss} = \frac{1}{N+M}\left(\sum_{i=1}^{N} E_{(X,A)}[\log F(h_i, s)] + \sum_{j=1}^{M} E_{(\tilde{X},\tilde{A})}[(1-\log F(\tilde{h}_i, \tilde{s}))]\right).$$

F denotes a discriminator function and is used to score the local features and the global feature. Exemplarily, in the case where a pre-trained sample is the positive sample event graph, the value of $F(h_i, s)$ is large, and in the case where the pre-trained sample is the attack sample, the value of $F(h_i, s)$ is small. Conversely, in the case where the pre-trained sample is the positive sample event graph, the value of $F(\tilde{h}_1, \tilde{s})$ is small, and in the case where the pre-trained sample is the attack sample, the value of $F(\tilde{h}_1, \tilde{s})$ is large. N and M denote the number of nodes in the positive sample event graph and the number of nodes in the attack sample respectively. $E_{(X,A)}$ denotes the mathematical expectation of the positive sample event graph; $E_{(\tilde{X},\tilde{A})}$ denotes the mathematical expectation of the attack sample.

A strong negative sample event graph is generated based on rare real complex network attack samples, and the preceding pre-trained preset attack feature recognition model is further fine-tuned to make the pre-trained preset attack feature recognition model more sensitive to a complex network attack behavior, thereby obtaining a trained preset attack feature recognition model.

The fine-tuning stage inherits parameters of the encoder in the pre-training stage and continues training and detecting the model using a real attack sample. The embedding of each edge in the real attack sample is obtained by concatenating the embeddings of nodes on both sides of each edge. Then, the embedding of each edge is mapped to the probability space of each edge belonging to the attack event through the fully-connected layer. The fine-tuning stage uses the following cross-entropy loss function to complete the training of the preset attack feature recognition model.

$\text{Loss}=\Sigma_x[y_x \log(p_x)+(1-y_x)\log(1-p_x)]$, where $y_x$ indicates an actual situation whether edge x is the attack event, and $p_x$ indicates the predicted probability that x belongs to the attack event.

Based on the output result of the preceding preset attack feature recognition model, an original graph, and the attack sample, one preset source tracing model is further trained. The model expresses the dependencies between the attack event and other process events in the form of conditional probability.

The attack event output by the preset attack feature recognition model and the network event graph input by the preset attack feature recognition model are acquired, and the attack event and the network event graph are used as the samples. Network event graphs are disturbed, and predictions of anomalies on these graphs are recorded and are called disturbed data. (that is, generate → preprocess → record a group of to-be-interpreted and predicted [input, output] pairs of data).

For the attack event et (a corresponding attack event variable in a probability graph network is represented by et in bold), a group of disturbed sample data $D_{et}$ is generated by disturbance (a corresponding disturbed data variable in the probability graph network is represented by D$_{et}$ in bold), that is, a set of [input, output] pairs for the correlation between each variable and a detection result in the preset source tracing model.

It is difficult to find one optimal preset source tracing model in full-amount disturbed data, because an L-hop neighboring set Neighb (et, Ge) of the target event et in the event graph Ge may include tens of thousands of nodes, and searching for the optimal preset source tracing model is very computationally intensive. Therefore, to reduce the number of variables in filtered data, which variables are unimportant and eliminated may be determined. The Markov blanket corresponding to the attack event et may be used to represent all the events important to the attack event et. That is, the Markov blanket can include all the statistical information of the attack event et. Therefore, selecting important data and filtering unimportant data in the disturbed sample data $D_{et}$ is equivalent to reducing all the L-hop neighboring events Neighb (et, Ge) of the attack event et to the Markov blanket M(et) of the attack event et, thereby reducing the computational space of the interpretation model learning the optimal preset source tracing model. The Markov blanket M(et) is calculated by the related grow-shrink (GS) algorithm. The data in the Markov blanket is used as the sample data.

The sample data is used as input to learn the preset source tracing model B for the target event et, and a target function is the Bayesian information criterion (BIC) score $OBJ_{et}(B)$. Under the premise that a sample meets an independently and identically distributed assumption, the log-likelihood is used to measure the degree of fitting between the network structure β and observation data $D_{et}[M(et)]$:

$OBJ_{et}(B)=BICscore(\beta, D_{et}[M(et)])=Dim[B] \cdot \log n - L(\theta_B', D_{et}[M(et)])$, where $D_{et}[M(et)]$ denotes data corresponding to the variable M(et), n denotes the number of samples of $D_{et}[M(et)]$, and Dim[B] denotes the dimension of the model parameter to be estimated by the Bayesian network B. The function $L(\theta_B', D_{et}[M(et)])$ denotes the log-likelihood estimate between $D_{et}[M(et)]$ and $\theta_B'$. $\theta_\beta$ denotes a parameter of the Bayesian network. $\theta_B'$ is the value of $\theta_\beta$ when the log-likelihood is maximized, that is, the maximum likelihood estimator.

Based on a BIC target function, the preset source tracing model may be solved by using an exhaustive method, and the dependencies between the target event and other events may be reflected through the network.

Figure 6:
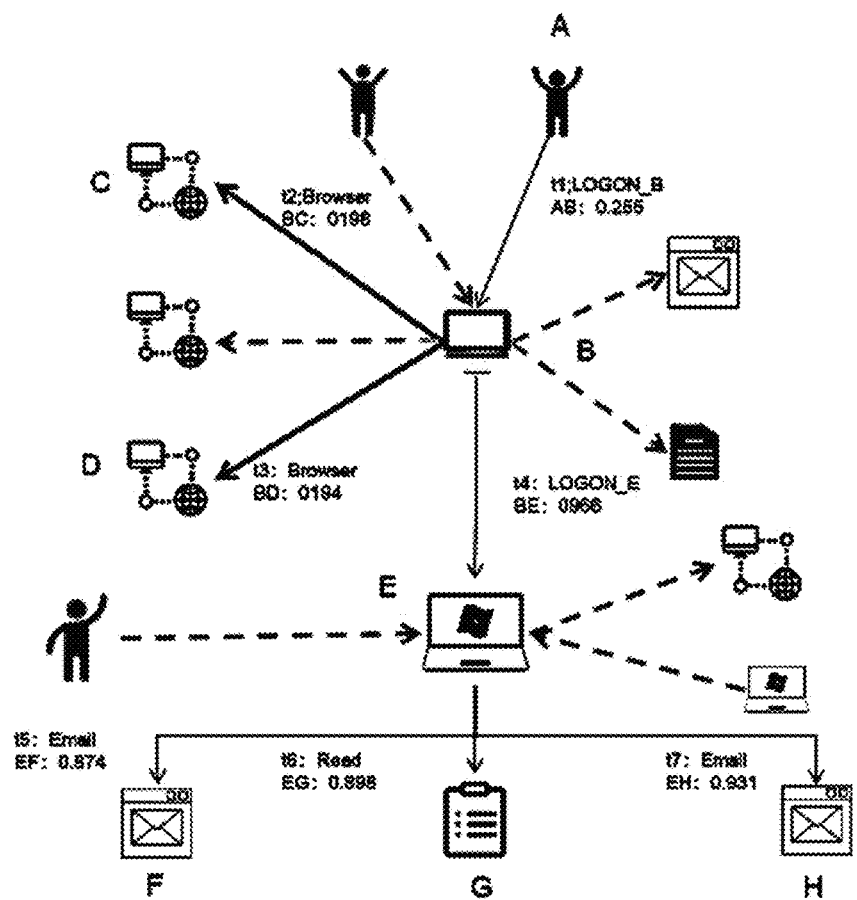
FIG. 6 is an example diagram of attack source tracing according to some embodiments of the present application.

In a possible embodiment, FIG. 6 is an example diagram of attack source tracing according to some embodiments of the present application. That an employee logs into another employee's machine, searches for and copies a private file, and sends the file to a private mailbox via email is used as an example. When it is detected that event t7 is an abnormal event, attention scores of neighboring nodes are analyzed, among which node E has the highest attention score. A query data set finds that node E sends a private file via email. In this manner, by further exploring the attention scores of node E's neighboring nodes and recursively source tracing forward, it is found that the source of this attack behavior is that the employee logged into another employee's computer E at time t4. E, sends a job application email to F at t5, accesses a private file at t6, and sends the private file via email at t7, eventually forming a complete abnormal behavior. In contrast, an interpretation model based on a spatiotemporal probability graph is used to obtain a causal chain that is closer to real cognition. A behavior chain formed by t1, t4, t5, and t6 has a gain effect on the abnormal determination probability of event t7, which is consistent with a result of an attention score method. Exemplarily, the output of the preset source tracing model may be a conditional probability table: $p(e_{t7}|e_{t6})=0.754$; $p(e_{t7}|e_{t5}e_{t6})=0.775$; $p(e_{t7}|e_{t4}e_{t5}e_{t6})=0.790$; $p(e_{t7}|e_{t4}e_{t4}e_{t5}e_{t6})=0.809$. It can be seen from the conditional probability table that the preset source tracing model may display the Markov blanket of the target event and filter out unimportant events, which is more intuitive than the attention score method that requires step-by-step recursion.

Figure 7:
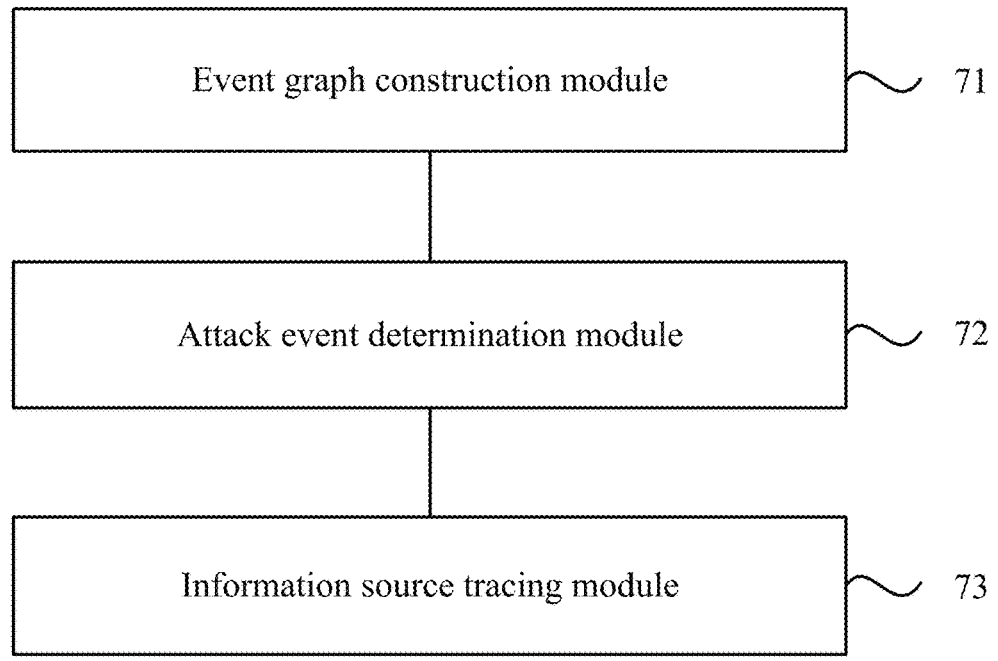
FIG. 7 is a structural diagram of an attack detection and source tracing apparatus according to some embodiments of the present application.

FIG. 7 is a structural diagram of an attack detection and source tracing apparatus according to some embodiments of the present application. As shown in FIG. 7, the apparatus includes an event graph construction module 71, an attack event determination module 72, and an information source tracing module 73.

The event graph construction module 71 is configured to acquire entities in a target network environment and multiple pieces of interaction event information between the entities and construct a network event graph with the entities and the multiple pieces of interaction event information.

The attack event determination module 72 is configured to determine a graph embedding vector of each piece of interaction event information in the network event graph as feature information based on a preset attack feature recognition model and determine an attack event in the network event graph according to the feature information.

The information source tracing module 73 is configured to determine dependencies between the attack event and remaining interaction event information in the network event graph and search for corresponding interaction event information as source tracing information of the attack event according to the dependencies.

In the embodiment of the present application, the event graph construction module acquires the entities in the target network environment and the multiple pieces of interaction event information between the entities and constructs the network event graph with the entities and the multiple pieces of interaction event information; the attack event determination module determines the graph embedding vector of each piece of interaction event information in the network event graph as the feature information based on the preset attack feature recognition model and determines the attack event in the network event graph according to the feature information, thereby automatically determining the attack event and improving the recognition capability of the attack event; the information source tracing module determines the dependencies between the attack event and the remaining interaction event information in the network event graph and searches for the corresponding interaction event information as the source tracing information of the attack event according to the dependencies, thereby facilitating the finding of a piece of interaction event information associated with the attack event, tracing source of the attack event, and improving the accuracy of the source tracing information. In this manner, a potential attack behavior in the target network environment can be detected timely and conveniently, and defense and response can be carried out in advance, thereby ensuring the security of the target network environment.

In a possible embodiment, the attack event determination module 72 includes the units below. A matrix determination unit is configured to extract, based on the preset attack feature recognition model, a node matrix formed by the entities in the network event graph and a graph adjacency matrix formed by the multiple pieces of interaction event information. A vector determination unit is configured to determine a node embedding vector of each node according to the node matrix and the graph adjacency matrix. A feature information determination unit is configured to concatenate node embedding vectors associated with each piece of interaction event information to obtain a graph embedding vector of each piece of interaction event information and use the graph embedding vector as feature information.

An attack event determination unit is configured to determine the probability that each piece of feature information belongs to the attack event, and use a piece of interaction event information corresponding to feature information whose probability is greater than or equal to a preset probability threshold as the attack event.

In a possible embodiment, the attack detection and source tracing apparatus further includes the modules below.

An attack graph determination module is configured to acquire open source network threat intelligence, extract first entities in the open source network threat intelligence and multiple pieces of interaction event information between the first entities by using a natural language processing technique, and construct an attack graph with the first entities as first nodes and the multiple pieces of interaction event information between the first entities as edges.

An event graph determination module is configured to extract a traffic log of a network environment, extract multiple pieces of interaction event information included in the traffic log, and construct an event graph with second entities corresponding to the multiple pieces of interaction event information as second nodes and the multiple pieces of interaction event information between the second entities as edges.

An initial graph generation module is configured to obtain a matching node by matching each first node with each second node, determine a target attack path between matching nodes, and generate an initial attack graph according to the target attack path.

A sample determination module is configured to determine a similarity score between the attack graph and the initial attack graph, determine a target attack graph in the initial attack graph according to the similarity score, and use the target attack graph on which data augmentation is performed as an attack sample.

A positive sample determination module is configured to acquire entities in a network environment for at least one moment and interaction event information between the entities and construct a positive sample event graph according to the entities and the interaction event information.

A model training module is configured to extract a real network attack sample from a configuration file and input the positive sample event graph, the real network attack sample, and the attack sample into the preset attack feature recognition model to train the preset attack feature recognition model.

In a possible embodiment, the initial graph generation module is configured to:
determine attribute information of each first node and match an associated point among the second nodes in the event graph as the matching node according to the attribute information, where the attribute information at least includes the name of each first node, the type of each first node, and feature information of each first node;
use any matching node as a starting node, traverse the event graph to search for remaining matching nodes, and determine attack paths between the matching nodes;
determine the number of nodes in each attack path and use an attack path in which the number of nodes is less than or equal to a preset number as the target attack path between the matching nodes; and
connect the matching nodes and the target attack path to generate the initial attack graph.

In a possible embodiment, the sample determination module is configured to:
determine connection paths of the matching nodes in the attack graph, determine the number of nodes in each connection path, determine the reciprocal of the number of nodes in a connection path corresponding to two matching nodes, and use the maximum value of the reciprocal as an influence score of the two matching nodes;
determine the total number of all the connection paths and add influence scores to obtain the sum of the influence scores;
use the product of the sum of the influence scores and the total number as the similarity score; and
in the case where the similarity score is greater than or equal to a preset similarity score, determine the initial attack graph as the target attack graph and perform the data augmentation on the target attack graph as the attack sample, where the data augmentation includes at least one of node disturbance, edge disturbance, attribute masking, or random subgraph sampling.

In a possible embodiment, the model training module is configured to:
use the positive sample event graph and the attack sample as pre-trained samples, input the pre-trained samples into the preset attack feature recognition model, extract local features of the pre-trained samples by using the preset attack feature recognition model respectively, and aggregate the local features as a global feature, where the preset attack feature recognition model is formed based on an encoder-decoder architecture;
determine a loss value of the preset attack feature recognition model based on a preset pre-trained network loss function, where the pre-trained network loss function at least includes binary cross-entropy;
iterate the preset attack feature recognition model by using the loss value until the number of times of iterations is reached, and adjust a parameter of the preset attack feature recognition model during the iteration process to obtain a pre-trained preset attack feature recognition model;
generate a real network attack sample graph with entities in the real network attack sample as nodes and multiple pieces of event information between the entities as edges, mark an attack event in the real network attack sample graph with an attack label, and input the real network attack sample graph and the attack label into the pre-trained preset attack feature recognition model;
determine the probability that each edge belongs to the attack event through a fully-connected layer of an initial model, and in the case where it is determined that the probability is greater than or equal to a preset threshold, determine a piece of event information corresponding to an edge as the attack event;
in the case where it is determined that the attack event includes the attack label, determine a determination marker of the attack event as 1, and in the case where it is determined that the attack event does not include the attack label, determine the determination marker of the attack event as 0; and
in the case where the determination marker is determined as 1, determine the product of a natural logarithm of each probability and a corresponding determination marker as a first parameter, in the case where the determination marker is determined as 0, determine a natural logarithm of the probability of not belonging to the attack event as a second parameter, use the sum of the first parameter and the second parameter that correspond to the real network attack sample graph as a loss function value of the pre-trained preset attack feature recognition model, and optimize the parameter of the preset attack feature recognition model according to the loss function value.

In a possible embodiment, the information source tracing module 73 includes the units below.

A model input unit is configured to input the attack event and the network event graph into the preset source tracing model, where the preset source tracing model is formed based on a Bayesian network.

An information source tracing unit is configured to determine correlation probabilities between the attack event and at least one piece of remaining interaction event information in the network event graph as the dependencies by polling the preset source tracing model and use at least one piece of remaining interaction event information with the highest dependency as the source tracing information of the attack event.

In a possible embodiment, the attack detection and source tracing apparatus further includes the modules below.

A sample generation module is configured to extract the attack event output by the preset attack feature recognition model and the network event graph input by the preset attack feature recognition model and perform data augmentation using the attack event and the network event graph as samples to obtain training samples.

A data determination module is configured to determine a Markov blanket of an attack event in the training samples according to a grow-shrink algorithm and use data in the Markov blanket as sample data.

A score determination module is configured to determine the sample size of the sample data and a log-likelihood value of the sample data and a model parameter, determine the product of a natural logarithm of the sample size and a dimension of the model parameter, and use the difference between the product and the log-likelihood value as a Bayesian information criterion score of the sample data and the model parameter in the preset attack feature recognition model.

A parameter adjustment module is configured to adjust the model parameter based on the Bayesian information criterion score until the Bayesian information criterion score reaches a target score to complete the training of the preset source tracing model.

The attack detection and source tracing apparatus provided in the embodiment of the present application can perform the attack detection and source tracing method provided in any embodiment of the present application and has function modules and beneficial effects that correspond to the performed method.

Figure 8:
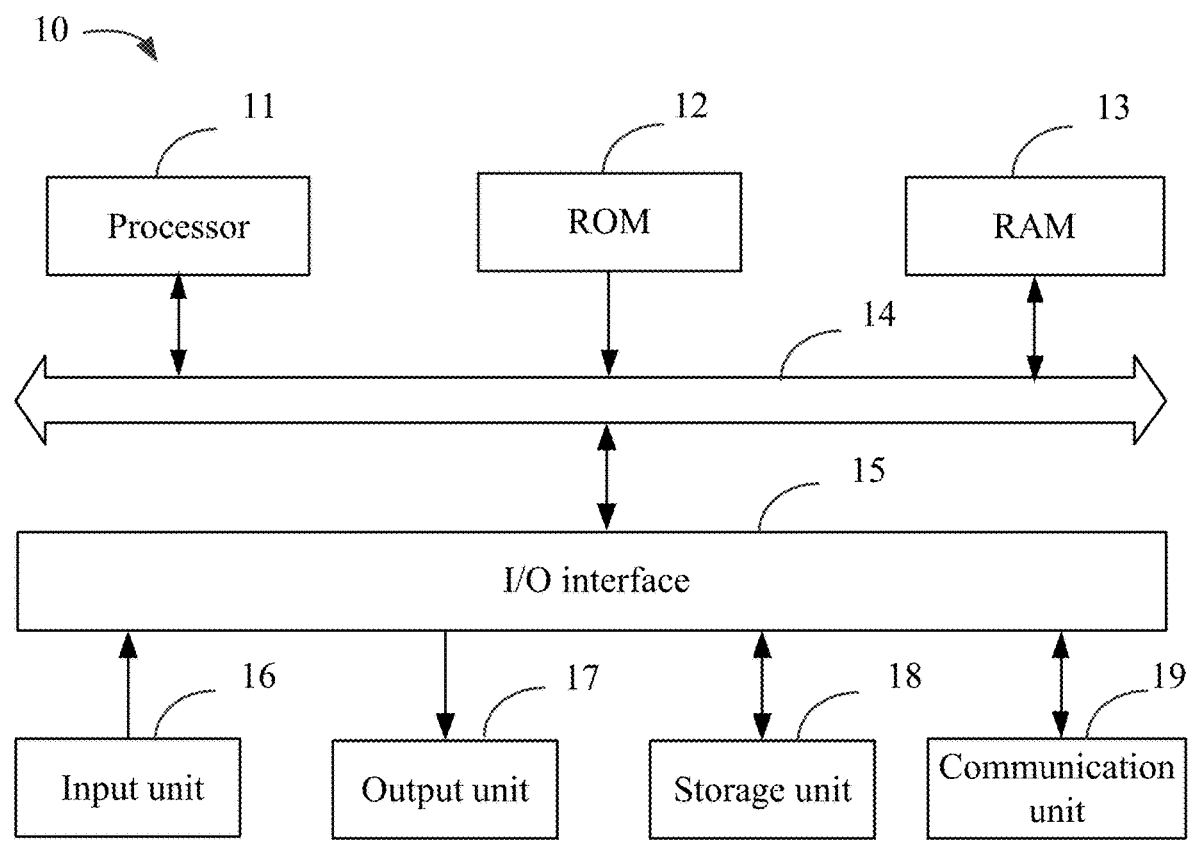
FIG. 8 is a structural diagram of an electronic device for implementing an attack detection and source tracing method according to an embodiment of the present application.

FIG. 8 is a structural diagram of an electronic device for implementing an attack detection and source tracing method according to an embodiment of the present application. The electronic device is intended to represent various forms of digital computers, for example, a laptop computer, a desktop computer, a worktable, a personal digital assistant, a server, a blade server, a mainframe computer, and an applicable computer. The electronic device may also represent various forms of mobile apparatuses, for example, a personal digital assistant, a cellphone, a smartphone, a wearable device (such as a helmet, glasses, or a watch), and a similar computing apparatus. Herein the shown components, the connections and relationships between these components, and the functions of these components are illustrative and are not intended to limit the implementation of the present application as described and/or claimed herein.

As shown in FIG. 8, the electronic device 10 includes at least one processor 11 and a memory, such as a read-only memory (ROM) 12 or a random-access memory (RAM) 13, communicatively connected to the at least one processor 11. The memory stores a computer program executable by the at least one processor. The at least one processor 11 may perform various types of appropriate operations and processing according to a computer program stored in the read-only memory (ROM) 12 or a computer program loaded from a storage unit 18 to the random-access memory (RAM) 13. Various programs and data required for the operation of the electronic device 10 may also be stored in the RAM 13. The at least one processor 11, the ROM 12, and the RAM 13 are connected to each other through a bus 14. An input/output (I/O) interface 15 is also connected to the bus 14.

Multiple components in the electronic device 10 are connected to the I/O interface 15. The multiple components include an input unit 16 such as a keyboard or a mouse, an output unit 17 such as various types of display or speaker, the storage unit 18 such as a magnetic disk or an optical disk, and a communication unit 19 such as a network card, a modem, or a wireless communication transceiver. The communication unit 19 allows the electronic device 10 to exchange information/data with other devices over a computer network such as the Internet and/or various telecommunications networks.

A processor 11 may be various general-purpose and/or special-purpose processing components having processing and computing capabilities. Examples of the processor 11 include, but are not limited to, a central processing unit (CPU), a graphics processing unit (GPU), a special-purpose artificial intelligence (AI) computing chip, a processor executing machine learning models and algorithms, a digital signal processor (DSP), and any appropriate processor, controller, and microcontroller. The processor 11 performs various preceding methods and processing, such as the attack detection and source tracing method.

In some embodiments, the attack detection and source tracing method may be implemented as computer programs tangibly contained in a computer-readable storage medium such as the storage unit 18. In some embodiments, part or all of the computer programs may be loaded and/or installed onto the electronic device 10 via the ROM 12 and/or the communication unit 19. When the computer programs are loaded to the RAM 13 and executed by the processor 11, one or more steps of the preceding attack detection and source tracing method may be performed. Alternatively, in other embodiments, the processor 11 may be configured, in any other suitable manner (for example, by means of firmware), to perform the attack detection and source tracing method.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Computer programs for implementation of the methods of the present application may be written in one programming language or any combination of multiple programming languages. The computer programs may be provided for a processor of a general-purpose computer, a special-purpose computer, or another programmable data processing apparatus to enable functions/operations specified in a flowchart and/or a block diagram to be implemented when the computer programs are executed by the processor. The computer programs may be executed entirely on a machine, partly on a machine, as a stand-alone software package, partly on a machine and partly on a remote machine, or entirely on a remote machine or a server.

In the context of the present application, the computer-readable storage medium may be a tangible medium that may include or store a computer program for use by or in connection with an instruction execution system, apparatus, or device. The computer-readable storage medium may include, but is not limited to, an electronic, magnetic, optical, electromagnetic, infrared, or semiconductor system, apparatus, or device, or any appropriate combination thereof. Alternatively, the computer-readable storage medium may be a machine-readable signal medium. Examples of a machine-readable storage medium include an electrical connection based on one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on the electronic device. The electronic device has a display device (for example, a cathode-ray tube (CRT) or a liquid-crystal display (LCD) monitor) for displaying information to the user; and a keyboard and a pointing device (for example, a mouse or a trackball) through which the user can provide input for the electronic device. Other types of apparatuses may also be used for providing interaction with the user. For example, feedback provided for the user may be sensory feedback in any form (for example, visual feedback, auditory feedback, or tactile feedback); and input from the user may be received in any form (including acoustic input, voice input, or tactile input).

The systems and techniques described herein may be implemented in a computing system including a back-end component (for example, a data server), a computing system including a middleware component (for example, an application server), a computing system including a front-end component (for example, a client computer having a graphical user interface or a web browser through which the user can interact with embodiments of the systems and techniques described herein), or a computing system including any combination of such back-end, middleware, or front-end components. Components of a system may be interconnected by any form or medium of digital data communication (for example, a communication network). Examples of the communication network include a local area network (LAN), a wide area network (WAN), a blockchain network, and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related virtual private server (VPS).

What is claimed is:

1. An attack detection and source tracing method, comprising:
    acquiring entities in a target network environment and a plurality of pieces of interaction event information between the entities and constructing a network event graph with the entities and the plurality of pieces of interaction event information;
    determining a graph embedding vector of each piece of interaction event information in the network event graph as feature information based on a preset attack feature recognition model and determining an attack event in the network event graph according to the feature information;
    determining dependencies between the attack event and remaining interaction event information in the network event graph and searching for corresponding interaction event information as source tracing information of the attack event according to the dependencies,
    wherein determining the dependencies between the attack event and the remaining interaction event information in the network event graph and searching for the corresponding interaction event information as the source tracing information of the attack event according to the dependencies comprises:
    inputting the attack event and the network event graph into a preset source tracing model, wherein the preset source tracing model is formed based on a Bayesian network; and
    determining correlation probabilities between the attack event and at least one piece of remaining interaction event information in the network event graph as the dependencies by polling the preset source tracing model, and using at least one piece of remaining interaction event information with a highest dependency as the source tracing information of the attack event.

2. The attack detection and source tracing method of claim 1, wherein determining the graph embedding vector of each piece of interaction event information in the network event graph as the feature information based on the preset attack feature recognition model and determining the attack event in the network event graph according to the feature information comprises:
    extracting, based on the preset attack feature recognition model, a node matrix formed by the entities in the network event graph and a graph adjacency matrix formed by the plurality of pieces of interaction event information;
    determining a node embedding vector of each node of nodes according to the node matrix and the graph adjacency matrix;
    concatenating node embedding vectors associated with each piece of interaction event information to obtain the graph embedding vector of each piece of interaction event information and using the graph embedding vector as the feature information; and
    determining a probability that each piece of feature information belongs to the attack event, and using a piece of interaction event information corresponding to a piece of feature information whose probability is greater than or equal to a preset probability threshold as the attack event.

3. The attack detection and source tracing method of claim 1, wherein training of the preset attack feature recognition model comprises:

acquiring open source network threat intelligence, extracting first entities in the open source network threat intelligence and a plurality of pieces of interaction event information between the first entities using a natural language processing technique, and constructing an attack graph with the first entities as first nodes and the plurality of pieces of interaction event information between the first entities as edges;

extracting a traffic log of a network environment, extracting a plurality of pieces of interaction event information comprised in the traffic log, and constructing an event graph with second entities corresponding to the plurality of pieces of interaction event information as second nodes and the plurality of pieces of interaction event information between the second entities as edges;

obtaining a matching node by matching each of the first nodes with each of the second nodes, determining a target attack path between matching nodes, and generating an initial attack graph according to the target attack path;

determining a similarity score between the attack graph and the initial attack graph, determining a target attack graph in the initial attack graph according to the similarity score, and performing data augmentation on the target attack graph as an attack sample;

acquiring entities in a network environment for at least one moment and interaction event information between the entities and constructing a positive sample event graph according to the entities and the interaction event information; and extracting a real network attack sample from a configuration file, and inputting the positive sample event graph, the real network attack sample, and the attack sample into the preset attack feature recognition model to train the preset attack feature recognition model.

4. The attack detection and source tracing method of claim 3, wherein obtaining the matching node by matching each of the first nodes with each of the second nodes, determining the target attack path between the matching nodes, and generating the initial attack graph according to the target attack path comprises:

determining attribute information of each of the first nodes and matching an associated point among the second nodes in the event graph as the matching node according to the attribute information; wherein the attribute information at least comprises a name of each of the first nodes, a type of each of the first nodes, and feature information of each of the first nodes;

using any matching node among the matching nodes as a starting node, traversing the event graph to find remaining matching nodes, and determining attack paths between the matching nodes;

determining a number of nodes in each of the attack paths and using an attack path among the attack paths in which the number of nodes is less than or equal to a preset number as the target attack path between the matching nodes; and connecting the matching nodes and the target attack path to generate the initial attack graph.

5. The attack detection and source tracing method of claim 3, wherein determining the similarity score between the attack graph and the initial attack graph, determining the target attack graph in the initial attack graph according to the similarity score, and performing the data augmentation on the target attack graph as the attack sample comprises:

determining connection paths of the matching nodes in the attack graph, determining a number of nodes in each of the connection paths, determining a reciprocal of a number of nodes in a connection path corresponding to two matching nodes among the matching nodes, and using a maximum value of the reciprocal as an influence score of the two matching nodes;

determining a total number of all the connection paths and adding influence scores to obtain a sum of the influence scores;

using a product of the sum of the influence scores and the total number as the similarity score; and in a case where the similarity score is greater than or equal to a preset similarity score, determining the initial attack graph as the target attack graph and performing the data augmentation on the target attack graph as the attack sample, wherein the data augmentation comprises at least one of node disturbance, edge disturbance, attribute masking, or random subgraph sampling.

6. The attack detection and source tracing method of claim 3, wherein inputting the positive sample event graph, the real network attack sample, and the attack sample into the preset attack feature recognition model to train the preset attack feature recognition model comprises:

using the positive sample event graph and the attack sample as pre-trained samples, inputting the pre-trained samples into the preset attack feature recognition model, extracting local features of the pre-trained samples by using the preset attack feature recognition model respectively, and aggregating the local features as a global feature, wherein the preset attack feature recognition model is formed based on an encoder-decoder architecture;

determining a loss value of the preset attack feature recognition model based on a preset pre-trained network loss function, wherein the pre-trained network loss function at least comprises binary cross-entropy;

iterating the preset attack feature recognition model by using the loss value until a number of times of iterations is reached and adjusting a parameter of the preset attack feature recognition model during an iteration process to obtain a pre-trained preset attack feature recognition model;

generating a real network attack sample graph with entities in the real network attack sample as nodes and a plurality of pieces of event information between the entities as edges, marking an attack event in the real network attack sample graph with an attack label, and inputting the real network attack sample graph and the attack label into the pre-trained preset attack feature recognition model;

determining a probability that each of the edges belongs to the attack event through a fully-connected layer of the preset attack feature recognition model, and in a case where it is determined that the probability is greater than or equal to a preset threshold, determining a piece of event information corresponding to an edge of the edges as the attack event;

in a case where it is determined that the attack event includes the attack label, determining a determination marker of the attack event as 1, and in a case where it is determined that the attack event does not include the attack label, determining the determination marker of the attack event as 0; and in a case where the determination marker is determined as 1, determining a product of a natural logarithm of each probability and a corresponding determination marker as a first parameter, in a case where the determination marker is determined as 0, determining a natural logarithm of a probability of not belonging to the attack event as a second parameter, using a sum of the first parameter and the second parameter that correspond to the real network attack sample graph as a loss function value of the pre-trained preset attack feature recognition model, and optimizing the parameter of the preset attack feature recognition model according to the loss function value.

7. The attack detection and source tracing method of claim 1, wherein training of the preset source tracing model comprises:
  extracting the attack event output by the preset attack feature recognition model and the network event graph input by the preset attack feature recognition model, and performing data augmentation using the attack event and the network event graph as samples to obtain training samples;
  determining a Markov blanket of an attack event in the training samples according to a grow-shrink algorithm and using data in the Markov blanket as sample data;
  determining a sample size of the sample data and a log-likelihood value of the sample data and a model parameter, determining a product of a natural logarithm of the sample size and a dimension of the model parameter, and using a difference between the product and the log-likelihood value as a Bayesian information criterion score of the sample data and the model parameter in the preset attack feature recognition model; and
  adjusting the model parameter based on the Bayesian information criterion score until the Bayesian information criterion score reaches a target score to complete the training of the preset source tracing model.

8. An electronic device, comprising:
  at least one processor; and
  a memory communicatively connected to the at least one processor,
  wherein the memory stores a computer program executable by the at least one processor to cause the at least one processor to perform an attack detection and source tracing method;
  wherein the attack detection and source tracing method comprises:
  acquiring entities in a target network environment and a plurality of pieces of interaction event information between the entities and constructing a network event graph with the entities and the plurality of pieces of interaction event information;
  determining a graph embedding vector of each piece of interaction event information in the network event graph as feature information based on a preset attack feature recognition model and determining an attack event in the network event graph according to the feature information;
  determining dependencies between the attack event and remaining interaction event information in the network event graph and searching for corresponding interaction event information as source tracing information of the attack event according to the dependencies; and
  wherein determining the dependencies between the attack event and the remaining interaction event information in the network event graph and searching for the corresponding interaction event information as the source tracing information of the attack event according to the dependencies comprises:
  inputting the attack event and the network event graph into a preset source tracing model, wherein the preset source tracing model is formed based on a Bayesian network; and
  determining correlation probabilities between the attack event and at least one piece of remaining interaction event information in the network event graph as the dependencies by polling the preset source tracing model, and using at least one piece of remaining interaction event information with a highest dependency as the source tracing information of the attack event.

9. The electronic device of claim 8,
wherein determining the graph embedding vector of each piece of interaction event information in the network event graph as the feature information based on the preset attack feature recognition model and determining the attack event in the network event graph according to the feature information comprises:
  extracting, based on the preset attack feature recognition model, a node matrix formed by the entities in the network event graph and a graph adjacency matrix formed by the plurality of pieces of interaction event information;
  determining a node embedding vector of each node of nodes according to the node matrix and the graph adjacency matrix;
  concatenating node embedding vectors associated with each piece of interaction event information to obtain the graph embedding vector of each piece of interaction event information and using the graph embedding vector as the feature information; and
  determining a probability that each piece of feature information belongs to the attack event, and using a piece of interaction event information corresponding to a piece of feature information whose probability is greater than or equal to a preset probability threshold as the attack event.

10. The electronic device of claim 8,
wherein training of the preset attack feature recognition model comprises:
  acquiring open source network threat intelligence, extracting first entities in the open source network threat intelligence and a plurality of pieces of interaction event information between the first entities using a natural language processing technique, and constructing an attack graph with the first entities as first nodes and the plurality of pieces of interaction event information between the first entities as edges;
  extracting a traffic log of a network environment, extracting a plurality of pieces of interaction event information comprised in the traffic log, and constructing an event graph with second entities corresponding to the plurality of pieces of interaction event information as second nodes and the plurality of pieces of interaction event information between the second entities as edges;
  obtaining a matching node by matching each of the first nodes with each of the second nodes, determining a target attack path between matching nodes, and generating an initial attack graph according to the target attack path;
  determining a similarity score between the attack graph and the initial attack graph, determining a target attack graph in the initial attack graph according to the similarity score, and performing data augmentation on the target attack graph as an attack sample;

acquiring entities in a network environment for at least one moment and interaction event information between the entities and constructing a positive sample event graph according to the entities and the interaction event information; and extracting a real network attack sample from a configuration file, and inputting the positive sample event graph, the real network attack sample, and the attack sample into the preset attack feature recognition model to train the preset attack feature recognition model.

11. The electronic device of claim 10,
wherein obtaining the matching node by matching each of the first nodes with each of the second nodes, determining the target attack path between the matching nodes, and generating the initial attack graph according to the target attack path comprises:

determining attribute information of each of the first nodes and matching an associated point among the second nodes in the event graph as the matching node according to the attribute information; wherein the attribute information at least comprises a name of each of the first nodes, a type of each of the first nodes, and feature information of each of the first nodes;

using any matching node among the matching nodes as a starting node, traversing the event graph to find remaining matching nodes, and determining attack paths between the matching nodes;

determining a number of nodes in each of the attack paths and using an attack path among the attack paths in which the number of nodes is less than or equal to a preset number as the target attack path between the matching nodes; and connecting the matching nodes and the target attack path to generate the initial attack graph.

12. The electronic device of claim 10,
wherein determining the similarity score between the attack graph and the initial attack graph, determining the target attack graph in the initial attack graph according to the similarity score, and performing the data augmentation on the target attack graph as the attack sample comprises:

determining connection paths of the matching nodes in the attack graph, determining a number of nodes in each of the connection paths, determining a reciprocal of a number of nodes in a connection path corresponding to two matching nodes among the matching nodes, and using a maximum value of the reciprocal as an influence score of the two matching nodes;

determining a total number of all the connection paths and adding influence scores to obtain a sum of the influence scores;

using a product of the sum of the influence scores and the total number as the similarity score; and in a case where the similarity score is greater than or equal to a preset similarity score, determining the initial attack graph as the target attack graph and performing the data augmentation on the target attack graph as the attack sample, wherein the data augmentation comprises at least one of node disturbance, edge disturbance, attribute masking, or random subgraph sampling.

13. The electronic device of claim 10,
wherein inputting the positive sample event graph, the real network attack sample, and the attack sample into the preset attack feature recognition model to train the preset attack feature recognition model comprises:

using the positive sample event graph and the attack sample as pre-trained samples, inputting the pre-trained samples into the preset attack feature recognition model, extracting local features of the pre-trained samples by using the preset attack feature recognition model respectively, and aggregating the local features as a global feature, wherein the preset attack feature recognition model is formed based on an encoder-decoder architecture;

determining a loss value of the preset attack feature recognition model based on a preset pre-trained network loss function, wherein the pre-trained network loss function at least comprises binary cross-entropy;

iterating the preset attack feature recognition model by using the loss value until a number of times of iterations is reached and adjusting a parameter of the preset attack feature recognition model during an iteration process to obtain a pre-trained preset attack feature recognition model;

generating a real network attack sample graph with entities in the real network attack sample as nodes and a plurality of pieces of event information between the entities as edges, marking an attack event in the real network attack sample graph with an attack label, and inputting the real network attack sample graph and the attack label into the pre-trained preset attack feature recognition model;

determining a probability that each of the edges belongs to the attack event through a fully-connected layer of the preset attack feature recognition model, and in a case where it is determined that the probability is greater than or equal to a preset threshold, determining a piece of event information corresponding to an edge of the edges as the attack event;

in a case where it is determined that the attack event includes the attack label, determining a determination marker of the attack event as 1, and in a case where it is determined that the attack event does not include the attack label, determining the determination marker of the attack event as 0, and in a case where the determination marker is determined as 1, determining a product of a natural logarithm of each probability and a corresponding determination marker as a first parameter in a case where the determination marker is determined as 0, determining a natural logarithm of a probability of not belonging to the attack event as a second parameter, using a sum of the first parameter and the second parameter that correspond to the real network attack sample graph as a loss function value of the pre-trained preset attack feature recognition model, and optimizing the parameter of the preset attack feature recognition model according to the loss function value.

14. The electronic device of claim 8,
wherein training of the preset source tracing model comprises:

extracting the attack event output by the preset attack feature recognition model and the network event graph input by the preset attack feature recognition model, and performing data augmentation using the attack event and the network event graph as samples to obtain training samples;

determining a Markov blanket of an attack event in the training samples according to a grow-shrink algorithm and using data in the Markov blanket as sample data;

determining a sample size of the sample data and a log-likelihood value of the sample data and a model parameter determining a product of a natural logarithm of the sample size and a dimension of the model parameter, and using a difference between the product and the log-likelihood value as a Bayesian information criterion score of the sample data and the model parameter in the preset attack feature recognition model; and adjusting the model parameter based on the Bayesian information criterion score until the Bayesian information criterion score reaches a target score to complete the training of the preset source tracing model.

15. A non-transitory computer-readable storage medium storing computer instructions that, when executed by a processor, are configured to cause the processor to perform an attack detection and source tracing method, wherein the attack detection and source tracing method comprises:

acquiring entities in a target network environment and a plurality of pieces of interaction event information between the entities and constructing a network event graph with the entities and the plurality of pieces of interaction event information, determining a graph embedding vector of each piece of interaction event information in the network event graph as feature information based on a preset attack feature recognition model and determining an attack event in the network event graph according to the feature information;

determining dependencies between the attack event and remaining interaction event information in the network event graph and searching for corresponding interaction event information as source tracing information of the attack event according to the dependencies; and wherein determining the dependencies between the attack event and the remaining interaction event information in the network event graph and searching for the corresponding interaction event information as the source tracing information of the attack event according to the dependencies comprises:

inputting the attack event and the network event graph into a preset source tracing model, wherein the preset source tracing model is formed based on a Bayesian network; and determining correlation probabilities between the attack event and at least one piece of remaining interaction event information in the network event graph as the dependencies by polling the preset source tracing model, and using at least one piece of remaining interaction event information with a highest dependency as the source tracing information of the attack event.

16. The non-transitory computer-readable storage medium of claim 15, wherein determining the graph embedding vector of each piece of interaction event information in the network event graph as the feature information based on the preset attack feature recognition model and determining the attack event in the network event graph according to the feature information comprises:

extracting, based on the preset attack feature recognition model, a node matrix formed by the entities in the network event graph and a graph adjacency matrix formed by the plurality of pieces of interaction event information;

determining a node embedding vector of each node of nodes according to the node matrix and the graph adjacency matrix;

concatenating node embedding vectors associated with each piece of interaction event information to obtain the graph embedding vector of each piece of interaction event information and using the graph embedding vector as the feature information; and determining a probability that each piece of feature information belongs to the attack event, and using a piece of interaction event information corresponding to a piece of feature information whose probability is greater than or equal to a preset probability threshold as the attack event.

17. The non-transitory computer-readable storage medium of claim 15, wherein training of the preset attack feature recognition model comprises:

acquiring open source network threat intelligence, extracting first entities in the open source network threat intelligence and a plurality of pieces of interaction event information between the first entities using a natural language processing technique, and constructing an attack graph with the first entities as first nodes and the plurality of pieces of interaction event information between the first entities as edges;

extracting a traffic log of a network environment extracting a plurality of pieces of interaction event information comprised in the traffic log, and constructing an event graph with second entities corresponding to the plurality of pieces of interaction event information as second nodes and the plurality of pieces of interaction event information between the second entities as edges;

obtaining a matching node by matching each of the first nodes with each of the second nodes, determining a target attack path between matching nodes, and generating an initial attack graph according to the target attack path;

determining a similarity score between the attack graph and the initial attack graph, determining a target attack graph in the initial attack graph according to the similarity score, and performing data augmentation on the target attack graph as an attack sample;

acquiring entities in a network environment for at least one moment and interaction event information between the entities and constructing a positive sample event graph according to the entities and the interaction event information; and extracting a real network attack sample from a configuration file, and inputting the positive sample event graph, the real network attack sample, and the attack sample into the preset attack feature recognition model to train the preset attack feature recognition model.

18. The non-transitory computer-readable storage medium of claim 17, wherein obtaining the matching node by matching each of the first nodes with each of the second nodes, determining the target attack path between the matching nodes, and generating the initial attack graph according to the target attack path comprises:

determining attribute information of each of the first nodes and matching an associated point among the second nodes in the event graph as the matching node according to the attribute information; wherein the attribute information at least comprises a name of each of the first nodes, a type of each of the first nodes, and feature information of each of the first nodes;

using any matching node among the matching nodes as a starting node, traversing the event graph to find remaining matching nodes, and determining attack paths between the matching nodes;

determining a number of nodes in each of the attack paths and using an attack path among the attack paths in which the number of nodes is less than or equal to a preset number as the target attack path between the matching nodes; and connecting the matching nodes and the target attack path to generate the initial attack graph.

19. The non-transitory computer-readable storage of claim 17, wherein determining the similarity score between the attack graph and the initial attack graph, determining the target attack graph in the initial attack graph according to the similarity score, and performing the data augmentation on the target attack graph as the attack sample comprises:

determining connection paths of the matching nodes in the attack graph, determining a number of nodes in each of the connection paths, determining a reciprocal of a number of nodes in a connection path corresponding to two matching nodes among the matching nodes, and using a maximum value of the reciprocal as an influence score of the two matching nodes;

determining a total number of all the connection paths and adding influence scores to obtain a sum of the influence scores;

using a product of the sum of the influence scores and the total number as the similarity score; and in a case where the similarity score is greater than or equal to a preset similarity score, determining the initial attack graph as the target attack graph and performing the data augmentation on the target attack graph as the attack sample, wherein the data augmentation comprises at least one of node disturbance, edge disturbance, attribute masking, or random subgraph sampling.

20. The non-transitory computer-readable storage medium of claim 17, wherein inputting the positive sample event graph, the real network attack sample, and the attack sample into the preset attack feature recognition model to train the preset attack feature recognition model comprises;

using the positive sample event graph and the attack sample as pre-trained samples, inputting the pre-trained samples into the preset attack feature recognition model, extracting local features of the pre-trained samples by using the preset attack feature recognition model respectively, and aggregating the local features as a global feature, wherein the preset attack feature recognition model is formed based on an encoder-decoder architecture;

determining a loss value of the preset attack feature recognition model based on a preset pre-trained network loss function, wherein the pre-trained network loss function at least comprises binary cross-entropy;

iterating the preset attack feature recognition model by using the loss value until a number of times of iterations is reached and adjusting a parameter of the preset attack feature recognition model during an iteration process to obtain a pre-trained preset attack feature recognition model;

generating a real network attack sample graph with entities in the real network attack sample as nodes and a plurality of pieces of event information between the entities as edges marking an attack event in the real network attack sample graph with an attack label, and inputting the real network attack sample graph and the attack label into the pre-trained preset attack feature recognition model;

determining a probability that each of the edges belongs to the attack event through a fully connected layer of the preset attack feature recognition model, and in a case where it is determined that the probability is greater than or equal to a preset threshold, determining a piece of event information corresponding to an edge of the edges as the attack event;

In a case where it is determined that the attack event includes the attack label, determining a determination marker of the attack event as 1, and in a case where it is determined that the attack event does not include the attack label, determining the determination marker of the attack event as 0; and in a case where the determination marker is determined as 1, determining a product of a natural logarithm of each probability and a corresponding determination marker as a first parameter, in a case where the determination marker is determined as 0, determining a natural logarithm of a probability of not belonging to the attack event as a second parameter, using a sum of the first parameter and the second parameter that correspond to the real network attack sample graph as a loss function value of the pre-trained preset attack feature recognition model, and optimizing the parameter of the preset attack feature recognition model according to the loss function value.

* * * * *